US012683745B2

(12) United States Patent
    Gao et al.

(10) Patent No.: US 12,683,745 B2
(45) Date of Patent: Jul. 14, 2026

(54) SYSTEMS AND METHODS FOR LINKING PDCCH CANDIDATES

(71) Applicant: Telefonaktiebolaget LM Ericsson (publ), Stockholm (SE)

(72) Inventors: Shiwei Gao, Nepean (CA); Mattias Frenne, Uppsala (SE); Siva Muruganathan, Stittsville (CA); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 314 days.

(21) Appl. No.: 18/272,227

(22) PCT Filed: Jan. 16, 2022

(86) PCT No.: PCT/IB2022/050331
    § 371 (c)(1),
    (2) Date: Jul. 13, 2023

(87) PCT Pub. No.: WO2022/153260
    PCT Pub. Date: Jul. 21, 2022

(65) Prior Publication Data
    US 2024/0089061 A1    Mar. 14, 2024

Related U.S. Application Data

(60) Provisional application No. 63/138,725, filed on Jan. 18, 2021, provisional application No. 63/138,192, filed on Jan. 15, 2021.

(51) Int. Cl.
    *H04L 5/00*        (2006.01)
    *H04W 72/23*       (2023.01)
(52) U.S. Cl.
    CPC ........... *H04L 5/0053* (2013.01); *H04W 72/23* (2023.01)

(58) Field of Classification Search
    CPC ..................... H04L 5/0053; H04W 72/23–232
    See application file for complete search history.

(56) References Cited

U.S. PATENT DOCUMENTS

| | | | |
|---|---|---|---|
| 9,924,502 | B2 | 3/2018 | Choi et al. |
| 2018/0279360 | A1 | 9/2018 | Park et al. |

(Continued)

FOREIGN PATENT DOCUMENTS

| | | | | |
|---|---|---|---|---|
| CN | 114499784 A | * | 5/2022 | ............ H04W 80/06 |
| WO | 2018228487 A1 | | 12/2018 | |

(Continued)

OTHER PUBLICATIONS

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.

(Continued)

*Primary Examiner* — Kevin C. Harper
(74) *Attorney, Agent, or Firm* — Withrow & Terranova, PLLC

(57)                 ABSTRACT

Systems and methods for linking Physical Downlink Control Channel (PDCCH) candidates are provided herein. In some embodiments, a method includes: receiving a configuration of a first and second Control Resource Set (CORESET) associated with a first and second Search Space (SS) set; determining that the first and second SS set are configured with a common set of parameters; activating the first and second CORESET with a first and second TCI state; linking a first PDCCH candidate in a first PDCCH monitoring occasion to a second PDCCH candidate in a second PDCCH monitoring occasion; receiving a PDCCH in the first PDCCH candidate and the PDCCH in the second PDCCH candidate; and detecting the PDCCH in the first and the second PDCCH candidates. Some embodiments might (Continued)

provide a simple way for linking PDCCH candidates in two SS sets to support both intra-slot and inter-slot PDCCH repetition in either TDM or FDM manner.

26 Claims, 21 Drawing Sheets

(56) References Cited

U.S. PATENT DOCUMENTS

| | | | | |
|---|---|---|---|---|
| 2020/0412515 | A1* | 12/2020 | Xu | H04W 4/70 |
| 2021/0195600 | A1* | 6/2021 | Khoshnevisan .. | H04W 72/0446 |
| 2022/0038207 | A1 | 2/2022 | Frenne et al. | |
| 2022/0225301 | A1* | 7/2022 | Khoshnevisan | H04L 5/0094 |
| 2022/0225378 | A1* | 7/2022 | Khoshnevisan | H04L 5/0053 |
| 2023/0363005 | A1* | 11/2023 | Cirik | H04W 52/242 |
| 2023/0403720 | A1* | 12/2023 | Song | H04W 72/232 |

FOREIGN PATENT DOCUMENTS

| | | | |
|---|---|---|---|
| WO | 2019208994 | A1 | 10/2019 |
| WO | 2020091574 | A1 | 5/2020 |
| WO | 2020192440 | A1 | 10/2020 |

OTHER PUBLICATIONS

Author Unknown, "Technical Specification Group Radio Access Network; NR; Physical layer procedures for control (Release 15)," Technical Specification 38.213, Version 1.0.2, Oct. 2017, 3GPP Organizational Partners, 23 pages.

Author Unknown, "Technical Specification Group Radio Access Network; NR; Radio Resource Control (RRC) protocol specification (Release 15)," Technical Specification 38.331, Version 15.1.0, Mar. 2018, 3GPP Organizational Partners, 268 pages.

Ericsson, "R1-1900728: On multi-TRP and multi-panel," 3GPP TSG RAN WG1 Ad-Hoc Meeting 1901, Jan. 21-25, 2019, Taipei, Taiwan, 9 pages.

Interdigital, Inc., "R1-2007627: Reliability Enhancements for PDCCH, PUCCH, and PUSCH," 3GPP TSG RAN WG1 #103-e, Oct. 26-Nov. 13, 2020, Electronic Meeting, 7 pages.

Notice of Reasons for Refusal for Japanese Patent Application No. 2023-541835, mailed Jul. 5, 2024, 7 pages.

Non-Final Office Action for U.S. Appl. No. 17/279,656, mailed Dec. 7, 2023, 18 pages.

OPPO, "R1-2008218: Enhancements on multi-TRP for PDCCH, PUCCH, and PUSCH," 3GPP TSG RAN WG1 #103-e, Oct. 26-Nov. 13, 2020, Electronic Meeting, 9 pages.

Decision to Grant for Japanese Patent Application No. 2023-541835, mailed Feb. 25, 2025, 6 pages.

Author Unknown, "Technical Specification Group Radio Access Network; NR; Physical layer procedures for control (Release 16)," Technical Specification 38.213, Version 16.4.0, Dec. 2020, 3GPP Organizational Partners, 181 pages.

Author Unknown, "Technical Specification Group Radio Access Network; NR; Physical layer procedures for data (Release 16)," Technical Specification 38.214, Version 16.4.0, Dec. 2020, 3GPP Organizational Partners, 169 pages.

CATT, "R1-2007825: Discussion on enhancements on multi-TRP/panel for PDCCH, PUCCH and PUSCH," 3GPP TSG RAN WG1 Meeting #103-e, Oct. 26-Nov. 13, 2020, Electronic Meeting, 15 pages.

Ericsson, "R1-2009223: On PDCCH, PUCCH and PUSCH enhancements with multiple TRPs," 3GPP TSG-RAN WG1 Meeting #103, Oct. 26-Nov. 13, 2020, Electronic Meeting, 25 pages.

International Search Report and Written Opinion for International Patent Application No. PCT/IB2022/050331, mailed Apr. 19, 2022, 14 pages.

Author Unknown, "Technical Specification Group Radio Access Network; NR; Radio Resource Control (RRC) protocol specification (Release 16)," Technical Specification 38.331, Version 16.3.1, Jan. 2021, 3GPP Organizational Partners, 932 pages.

CATT, "R1-1801750: Discussion on enhanced PDCCH for NR URLLC," 3GPP TSG RAN WG1 Meeting #92, Feb. 26-Mar. 2, 2018, Athens, Greece, 3 pages.

NTT DOCOMO, Inc., et al., "R1-1805063: Necessity of PDCCH repetition," 3GPP TSG RAN WG1 Meeting #92bis, Apr. 16-20, 2018, Sanya, China, 6 pages.

Vivo, "R1-1803847: Discussion on PDCCH repetition for URLLC," 3GPP TSG RAN WG1 Meeting #92bis, Apr. 16-20, 2018, Sanya, China, 6 pages.

International Search Report and Written Opinion for International Patent Application No. PCT/EP2019/075223, mailed Jan. 8, 2020, 10 pages.

Office Action for Colombian Patent Application No. NC2023/0009190, mailed Apr. 22, 2026, 37 pages.

* cited by examiner

ONE SLOT (14 SYMBOLS)

CONTROL (PDCCH), POSSIBLY DATA

PDCH (DATA)

RESOURCE BLOCK

RESOURCE ELEMENT

FREQUENCY

TIME

SYSTEM BANDWIDTH

ONE SLOT

OFDM SYMBOL #

0 1 2 3 4 5 6 7 8 9 10 11 12 13

SUBCARRIERS 11 10 9 8 7 6 5 4 3 2 1 0

A 14-SYMBOL SLOT

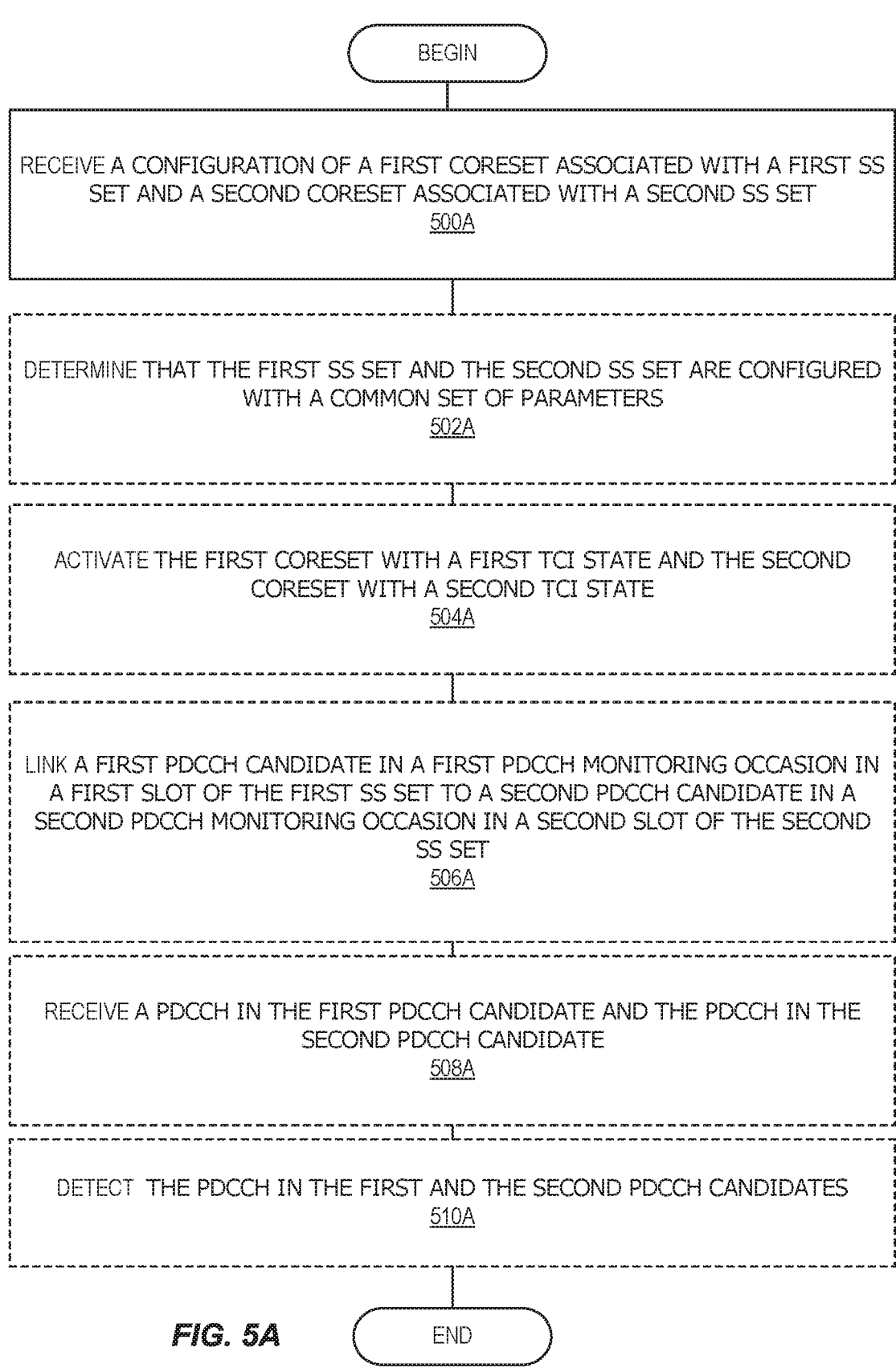

BEGIN

RECEIVE A CONFIGURATION OF A FIRST CORESET ASSOCIATED WITH A FIRST SS SET AND A SECOND CORESET ASSOCIATED WITH A SECOND SS SET
500A

DETERMINE THAT THE FIRST SS SET AND THE SECOND SS SET ARE CONFIGURED WITH A COMMON SET OF PARAMETERS
502A

ACTIVATE THE FIRST CORESET WITH A FIRST TCI STATE AND THE SECOND CORESET WITH A SECOND TCI STATE
504A

LINK A FIRST PDCCH CANDIDATE IN A FIRST PDCCH MONITORING OCCASION IN A FIRST SLOT OF THE FIRST SS SET TO A SECOND PDCCH CANDIDATE IN A SECOND PDCCH MONITORING OCCASION IN A SECOND SLOT OF THE SECOND SS SET
506A

RECEIVE A PDCCH IN THE FIRST PDCCH CANDIDATE AND THE PDCCH IN THE SECOND PDCCH CANDIDATE
508A

DETECT THE PDCCH IN THE FIRST AND THE SECOND PDCCH CANDIDATES
510A

END

*FIG. 5A*

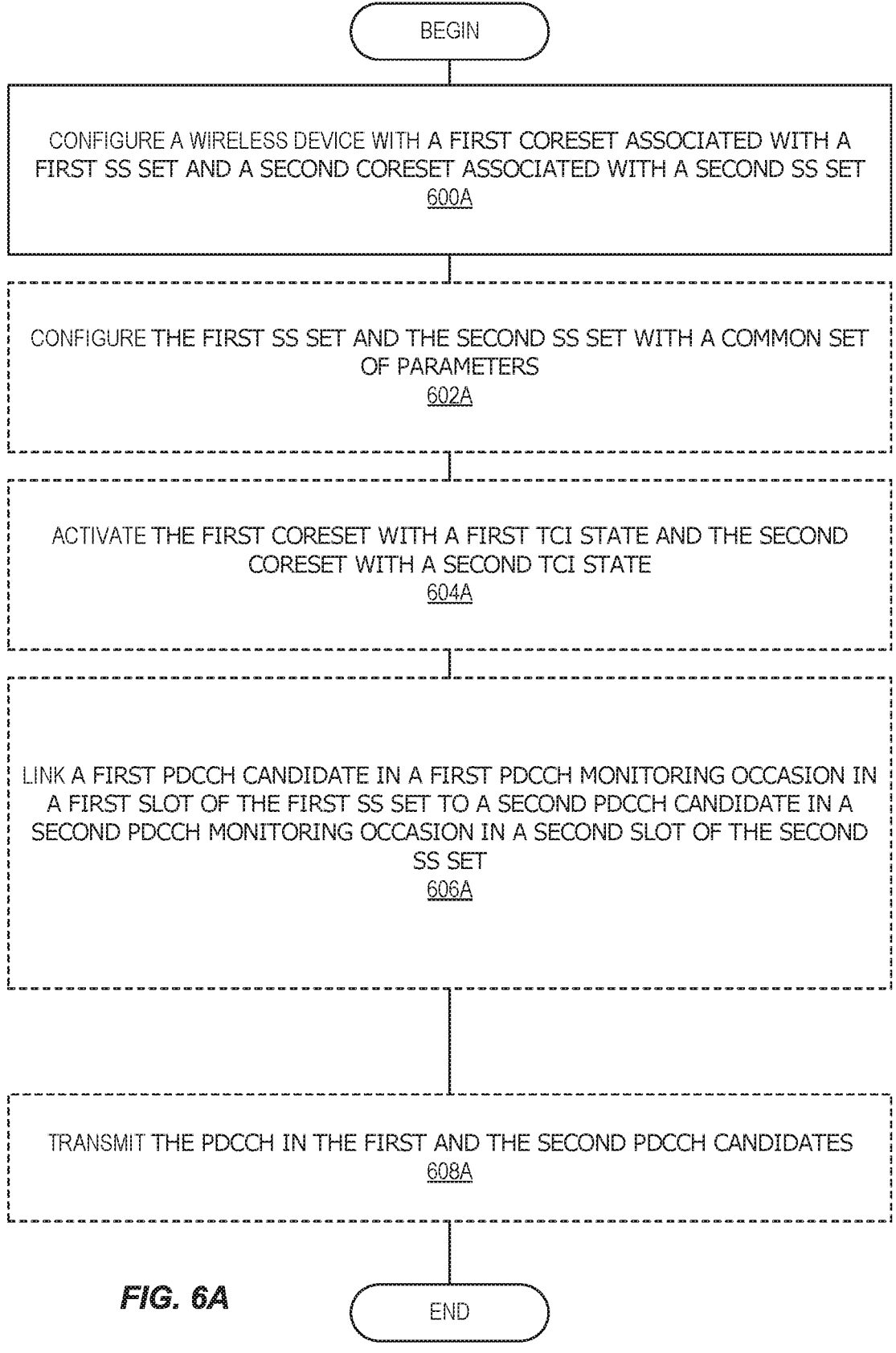

BEGIN

CONFIGURE A WIRELESS DEVICE WITH A FIRST CORESET ASSOCIATED WITH A FIRST SS SET AND A SECOND CORESET ASSOCIATED WITH A SECOND SS SET
600A

CONFIGURE THE FIRST SS SET AND THE SECOND SS SET WITH A COMMON SET OF PARAMETERS
602A

ACTIVATE THE FIRST CORESET WITH A FIRST TCI STATE AND THE SECOND CORESET WITH A SECOND TCI STATE
604A

LINK A FIRST PDCCH CANDIDATE IN A FIRST PDCCH MONITORING OCCASION IN A FIRST SLOT OF THE FIRST SS SET TO A SECOND PDCCH CANDIDATE IN A SECOND PDCCH MONITORING OCCASION IN A SECOND SLOT OF THE SECOND SS SET
606A

TRANSMIT THE PDCCH IN THE FIRST AND THE SECOND PDCCH CANDIDATES
608A

*FIG. 6A*

END

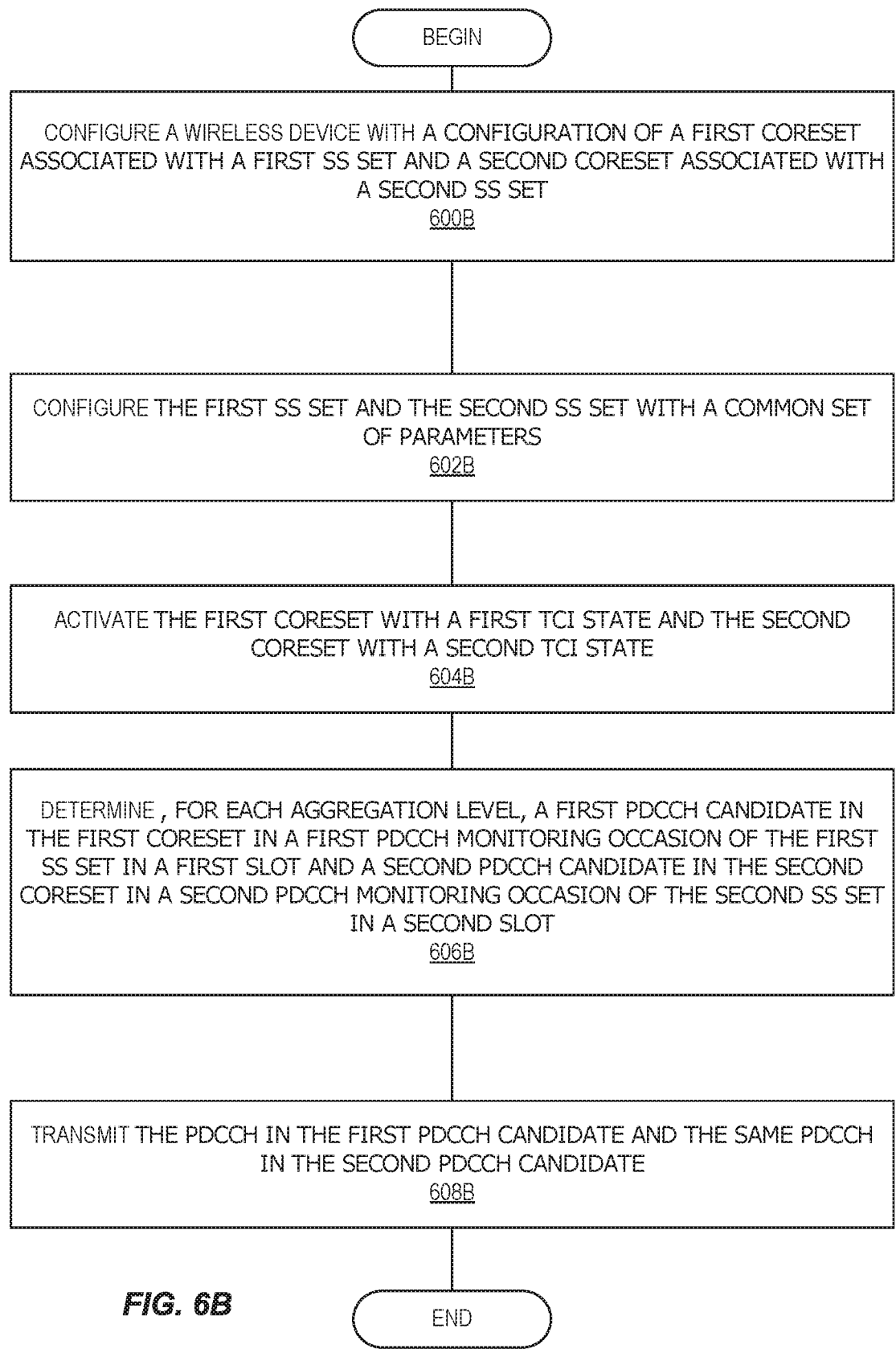

FIG. 6B

BEGIN

CONFIGURE A WIRELESS DEVICE WITH A CONFIGURATION OF A FIRST CORESET ASSOCIATED WITH A FIRST SS SET AND A SECOND CORESET ASSOCIATED WITH A SECOND SS SET
600B

CONFIGURE THE FIRST SS SET AND THE SECOND SS SET WITH A COMMON SET OF PARAMETERS
602B

ACTIVATE THE FIRST CORESET WITH A FIRST TCI STATE AND THE SECOND CORESET WITH A SECOND TCI STATE
604B

DETERMINE , FOR EACH AGGREGATION LEVEL, A FIRST PDCCH CANDIDATE IN THE FIRST CORESET IN A FIRST PDCCH MONITORING OCCASION OF THE FIRST SS SET IN A FIRST SLOT AND A SECOND PDCCH CANDIDATE IN THE SECOND CORESET IN A SECOND PDCCH MONITORING OCCASION OF THE SECOND SS SET IN A SECOND SLOT
606B

TRANSMIT THE PDCCH IN THE FIRST PDCCH CANDIDATE AND THE SAME PDCCH IN THE SECOND PDCCH CANDIDATE
608B

END

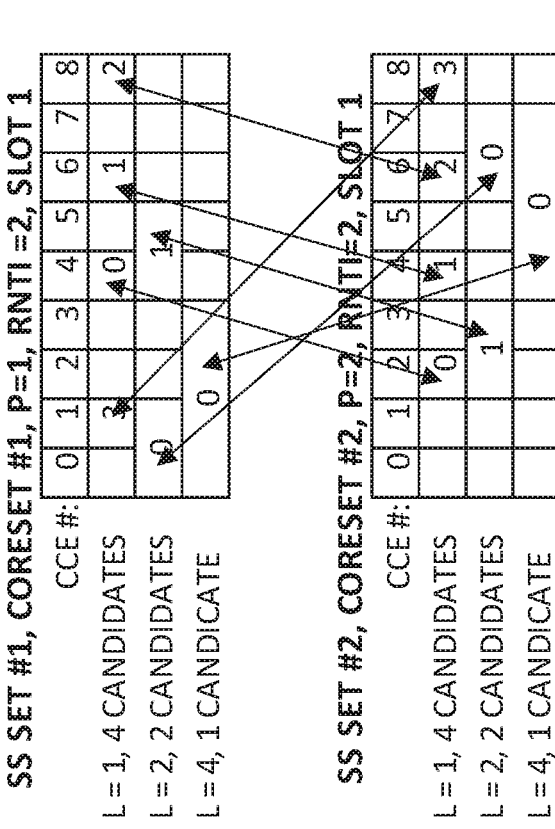
*FIG. 8*

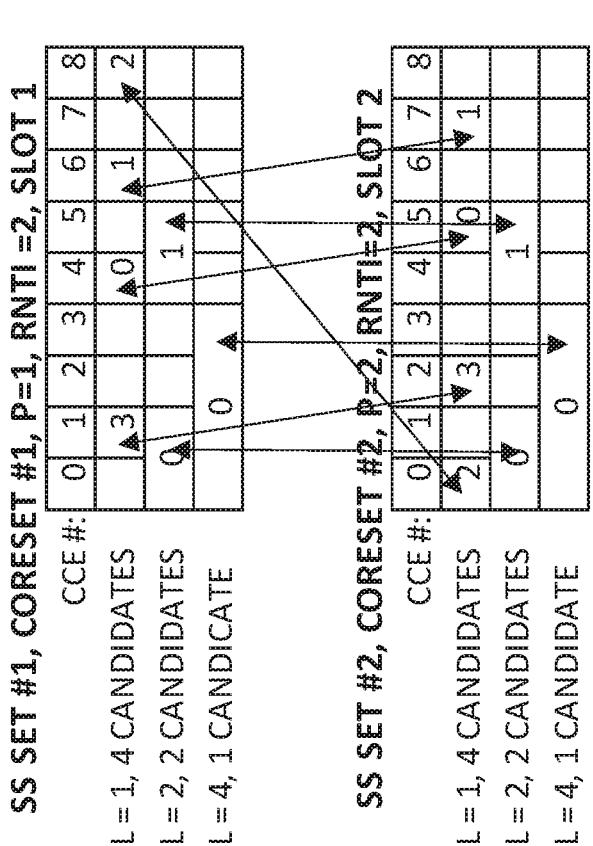
*FIG. 11*

1400

SYSTEMS AND METHODS FOR LINKING PDCCH CANDIDATES

RELATED APPLICATIONS

This application is a 35 U.S.C. § 371 national phase filing of International Application No. PCT/IB2022/050331, filed Jan. 16, 2022, which claims the benefit of provisional patent application Ser. No. 63/138,192, filed Jan. 15, 2021 and provisional patent application Ser. No. 63/138,725, filed Jan. 18, 2021, the disclosures of which are hereby incorporated herein by reference in their entireties.

TECHNICAL FIELD

The present disclosure relates to linking Physical Downlink Control Channel (PDCCH) candidates.

BACKGROUND

NR uses CP-OFDM (Cyclic Prefix Orthogonal Frequency Division Multiplexing) in both downlink (i.e., from a network node, gNB, or base station, to a user equipment or UE) and uplink (i.e., from UE to gNB). DFT spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe and each slot consists of 14 OFDM symbols.

FIG. 1: NR time-domain structure with 15 kHz subcarrier spacing. Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^{\mu})$kHz where $\mu \in 0$, 1, 2, 3, 4. $\Delta f=15$ kHz is the basic subcarrier spacing. The slot durations at different subcarrier spacings is given by $$\frac{1}{2^{\mu}}$$

ms.

In the frequency domain, a system bandwidth is divided into resource blocks (RBs), each corresponding to 12 contiguous subcarriers. The RBs are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one resource element (RE).

Downlink and uplink transmissions can be either dynamically scheduled in which the gNB transmits a DL assignment or a uplink grant via downlink control information (DCI) over PDCCH (Physical Downlink Control Channel) to a UE for each PDSCH or PUSCH transmission, or semi-persistent scheduled (SPS) in which one or more DL SPS or UL configured grants (CGs) are semi-statically configured and each can be activated or deactivated by a DCI.

CORESET and Search Space

A UE monitors a set of PDCCH candidates for potential PDCCHs. A PDCCH candidate consists of $L \in [1,2,4,8,16]$ control-channel elements (CCEs) in a Control Resource Set (CORESET). A CCE consists of 6 resource-element groups (REGs) where a REG equals one RB during one OFDM symbol. L is referred to as the CCE aggregation level.

The set of PDCCH candidates is defined in terms of PDCCH search space (SS) sets. A SS set can be a Common Search Space (CSS) set or a UE Specific Search Space (USS) set. A UE can be configured with up to 10 SS sets per bandwidth part (BWP) for monitoring PDCCH candidates.

Each SS set is associated with a CORESET. A CORESET consists of $$N_{RB}^{CORESET}$$

resource blocks in the frequency domain and $$N_{symb}^{CORESET} \in \{1, 2, 3\}$$

consecutive OFDM symbols in the time domain. In NR Rel-15, a UE can be configured with up to 3 CORESETs per bandwidth part.

For each SS set, a UE is configured with the following parameters comprising:
  a search space set index s, $0 \le s < 40$
  an association between the search space set s and a CORESET p
  a PDCCH monitoring periodicity of $k_s$ slots and a PDCCH monitoring offset of $o_s$ slots
  a PDCCH monitoring pattern within a slot, indicating first symbol(s) of the CORESET within a slot for PDCCH monitoring
  a duration of $T_s < k_s$ slots indicating a number of slots that the search space set exists
  a number of PDCCH candidates $$M_s^{(L)}$$

per CCE aggregation level L
  an indication that search space set s is either a CSS set or a USS set
  DCI formats to monitoring
  A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in slot $$n_{s,f}^{\mu}$$

in frame $n_f$ if $$(n_f \cdot N_{slot}^{frame,\mu} + n_{s,f}^{\mu} - o_s) \bmod k_s = 0,$$

where $$N_{slot}^{frame,\mu}$$

is the number of slots per radio frame. The UE monitors PDCCH candidates for search space set s for $T_s$ consecutive slots, starting from slot $$n_{s,f}^{\mu},$$

and does not monitor PDCCH candidates for search space set s for the next $k_s$-$T_s$ consecutive slots.

According to 3GPP TS38.213, for a search space set s associated with CORESET p, the CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i$$

Where for any CSS, $$Y_{p,n_{s,f}^{\mu}} = 0;$$

for USS, $$Y_{p,n_{s,f}^{\mu}} = \left( A_p \cdot Y_{p,n_{s,f}^{\mu}-1} \right)$$

modD, $Y_{p,-1} = n_{RNTI} \neq 0$, $A_p = 39827$ for pmod3=0, $A_p = 39829$ for pmod3=1, $A_p = 39839$ for pmod3=2, and D=65537;

i=0, . . . , L−1; $N_{CCE,p}$ is the number of CCEs, numbered from 0 to $N_{CCE,p}$−1, in CORESET p; $n_{CI}$ is the carrier indicator field value if the UE is configured with a carrier indicator field by CrossCarrierSchedulingConfig for the serving cell on which PDCCH is monitored; otherwise, including for any CSS, $n_{CI}$=0; $m_{s,n_{CI}}$=0, . . . , $$M_{s,n_{CI}}^{(L)} - 1,$$

where $$M_{s,n_{CI}}^{(L)}$$

is the number of PDCCH candidates the UE is configured to monitor for aggregation level L of a search space set s for a serving cell corresponding to $n_{CI}$; for any CSS, $$M_{s,max}^{(L)} = M_{s,0}^{(L)};$$

for a USS, $$M_{s,max}^{(L)}$$

is the maximum of $$M_{s,n_{CI}}^{(L)}$$

over all configured $n_{CI}$ values for a CCE aggregation level L of search space set s; the RNTI value used for $n_{RNTI}$ is the C-RNTI assigned to a UE.

NR HARQ ACK/NACK Feedback Over PUCCH

When receiving a PDSCH in the downlink from a serving gNB at slot n, a UE feeds back a HARQ ACK at slot n+k over a PUCCH (Physical Uplink Control Channel) resource in the uplink to the gNB if the PDSCH is decoded successfully, otherwise, the UE sends a HARQ NACK at slot n+k to the gNB to indicate that the PDSCH is not decoded successfully.

In NR, up to four PUCCH resource sets can be configured to a UE. A PUCCH resource set with pucch-Resource-SetId=0 can have up to 32 PUCCH resources while for PUCCH resource sets with pucch-ResourceSetId=1 to 3, each set can have up to 8 PUCCH resources. A UE determines the PUCCH resource set in a slot based on the number of aggregated UCI (Uplink Control Information) bits to be sent in the slot. The UCI bits consists of HARQ ACK/NACK, scheduling request (SR), and channel state information (CSI) bits.

A 3 bits PRI field in DCI maps to a PUCCH resource in a set of PUCCH resources with a maximum of eight PUCCH resources. When the number of PUCCH resources, $R_{PUCCH}$, in the first set of PUCCH resources is larger than eight, the UE determines a PUCCH resource with index $r_{PUCCH}$, $0 \leq r_{PUCCH} \leq R_{PUCCH}-1$, for carrying HARQ-ACK information as:

$$r_{PUCCH} =$$

$$\begin{cases} \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lfloor R_{PUCCH}/8 \rfloor}{N_{CCE,p}} \right\rfloor + \Delta_{PRI} \cdot \left\lfloor \dfrac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p over which a last DCI among DCIs the UE received with PUCCH transmission in a same slot, $n_{CCE,p}$ is the index of a first CCE for the PDCCH reception, and $\Delta_{PRI}$ is a value of the PUCCH resource indicator field in the last DCI.

PDCCH Repetition

FIG. 3: An example of PDCCH repetition from multiple TRPs. In NR Rel-17, it has been proposed to enhance PDCCH reliability with multiple TRPs by repeating a PDCCH over different TRPs, an example is shown in FIG. 3, where a PDCCH is repeated over two TRPs at different times, both contains the same DCI.

The PDCCH are repeated in two PDCCH candidates each associated with one of the two TRPs. The two PDCCH candidates are linked, i.e., the location of one PDCCH candidate can be obtained from the other PDCCH candidate. When performing PDCCH detection, a UE may detect PDCCH individually in each PDCCH candidate or jointly by soft combining of the two linked PDCCH candidates. The linked PDCCH candidates can be in two linked search space sets, each associated with a different CORESET. Each of the two associated CORESETs may be activated with a transmission configuration indicator (TCI) state associated with the respective TRP.

A TCI state activated for a CORESET contains Quasi Co-location (QCL) information between the Demodulation Reference Signal (DMRS) of PDCCH transmitted in the CORESET and one or two DL reference signals (RS) such as a CSI-RS (Channel State Information Reference Signal) or a SSB (Synchronization Signal Block). The DL RS are referred to as QCL source RS. The supported QCL information types in NR are:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The QCL information can be used by a UE to apply one or more channel properties estimated from the associated with the DL reference signals (CSI-RS or SSB) to PDCCH reception. For example, if a SSB is configured as the QCL-typeD source RS in an activated TCI state for a CORESET, the same receive beam for receiving the SSB would be used by a UE to receive PDCCHs in the CORESET. If a CSI-RS is configured as the QCL-typeA source RS in an activated TCI state for a CORESET, the estimated Doppler shift, Doppler spread, average delay, and delay spread based on the CSI-RS can be used for determining channel estimation parameters for PDCCH receptions in the CORESET. Improved systems and methods for linking PDCCH candidates are needed.

SUMMARY

Systems and methods for linking Physical Downlink Control Channel (PDCCH) candidates are provided herein. In some embodiments, a method performed by a wireless device for linking PDCCH candidates in two linked Search Space (SS) sets includes: receiving, from a wireless node, a configuration of a first Control Resource Set (CORESET) associated with a first SS set and a second CORESET associated with a second SS set; determining that the first SS set and the second SS set are configured with a common set of parameters comprising one or more of: a PDCCH monitoring periodicity of k_s slots; a number of PDCCH candidates $$M_s^{(L)}$$

per aggregation level L; a SS set type of either a Common Search Space (CSS) set or a UE Specific Search Space (USS) set; and Downlink Control Information (DCI) formats to monitor; activating the first CORESET with a first TCI state and the second CORESET with a second TCI state; linking a first PDCCH candidate in a first PDCCH monitoring occasion in a first slot of the first SS set to a second PDCCH candidate in a second PDCCH monitoring occasion in a second slot of the second SS set; receiving, from the wireless node, a PDCCH in the first PDCCH candidate and the PDCCH in the second PDCCH candidate; and detecting the PDCCH in the first and the second PDCCH candidates. Some embodiments might provide a simple way for linking PDCCH candidates in two SS sets to support both intra-slot and inter-slot PDCCH repetition in either TDM or FDM manner.

Certain aspects of the present disclosure and their embodiments may provide solutions to the aforementioned or other challenges. A method is proposed on how to link PDCCH candidates in two linked SS sets.

There are, proposed herein, various embodiments which address one or more of the issues disclosed herein. The method comprises: Configuring a first SS set and a second SS set with a common set of parameters including one or more of: A PDCCH monitoring periodicity of k_s slots; A duration of T_s<k_s slots indicating a number of consecutive slots for PDCCH monitoring; A number of PDCCH candidates $$M_s^{(L)}$$

per aggregation level L; A SS set type of either a CSS set or a USS set; DCI formats to monitoring; A number of starting symbols of the corresponding CORESET; Configuring SS set specific PDCCH monitoring slot offset and PDCCH monitoring pattern in a slot.

First Linking a first PDCCH monitoring slot in the first SS set to a second PDCCH monitoring slot in the second SS set; next linking a first monitoring occasion in the first PDCCH monitoring slot to the second monitoring occasion in the second PDCCH monitoring slot, then linking a first PDCCH candidate in the first PDCCH monitoring occasion to a second PDCCH candidate in the second linked PDCCH.

A method of PDCCH repetition over a first and a second search space, SS, sets in a wireless network consisting of at least a wireless node and at least a user equipment, UE. The method comprising: Configuring, by the wireless node, the UE with a first CORESET associated with the first SS set and a second CORESET associated with the second SS set search space set; Configuring the first and the second SS sets with a common set of parameters including one or more of: A PDCCH monitoring periodicity of k_s slots; A number of PDCCH candidates M_s^((L)) per aggregation level L; A SS set type of either a CSS set or a USS set; DCI formats to monitoring.

The method might also include activating the first CORESET with a first TCI state and the second CORESET with a second TCI state; Linking a first PDCCH candidate in a first PDCCH monitoring occasion in a first slot of the first SS set to a second PDCCH candidate in a second PDCCH monitoring occasion in a second slot of the second SS set; Transmitting, by the wireless node, a PDCCH in the first PDCCH candidate and repeating the PDCCH in the second PDCCH candidate; and Detecting, by the UE, the PDCCH in the first and the second PDCCH candidates.

In some embodiments, the first and the second PDCCH candidates correspond to a same CCE aggregation level and have a same PDCCH candidate index;

In some embodiments, the method further comprises configuring the first and the second SS sets, respectively, with a first and a second PDCCH monitoring slot offsets, O_s1 and O_s2, a first and a second duration, T_s1 and T_s2, indicating a number of consecutive slots for PDCCH monitoring, and a first and a second PDCCH monitoring patterns within a PDCCH monitoring slot.

In some embodiments, the symbol indices $\{l_1, l_2, \ldots, l_{N_{s1}}\}$ and the second PDCCH monitoring pattern contains a set of starting symbols with symbol indices $\{s_1, s_2, \ldots, s_{N_{s2}}\}$, where $N_{s1}$ and $N_{s2}$ are integers.

In some embodiments, the first slot $n_1$ of the first SS set and the second slot $n_2$ of the second SS set satisfying $n_1=nK_s+O_{s1}+i$ and $n_2=nK_s+O_{s2}+i$, where n is an integer and $i=0, 1, \ldots, \min (T_{s1}, T_{s2})-1$.

In some embodiments, the first PDCCH monitoring occasion starts at symbol $l_i$ in the first slot of the first SS set and the second PDCCH monitoring occasion starts at symbol $s_i$ in the second slot of the second SS set, where $i=1, \ldots \min (N_{s1}, N_{s2})$.

In some embodiments, the method further comprises determining a time off set between reception of the PDCCH and a scheduled one of a PDSC, a PUSCH, a CSI-RS, and a SRS, wherein the time offset is determined between a symbol of the first and the second PDCCH candidates occurring last in time and the first symbol of the corresponding one of PDSCH, PUSCH, CSI-RS, and SRS.

In some embodiments, the method further comprises determining a PUCCH resource for carrying a HARQ A/N associated with a scheduled PDSCH, wherein the determining a PUCCH resource comprises determining a PDCCH candidate among the first and the second PDCCH candidates associated with a SS set having a lower SS ID or with an associated CORESET having a lower CORESET ID.

In some embodiments, the PUCCH resource is determined based on the determined PDCCH candidate and the associated CORESET.

In some embodiments, the method further comprises determining a starting symbol of the PDCCH as the starting symbol is determined as the starting symbol of one of the first and the second PDCCH monitoring occasions occurring later in time.

In some embodiments, the first and the second SS sets are linked via an identifier.

In some embodiments, a method in a UE, receiving PDCCH repetition over a first and a second search space, SS, sets in a wireless network consisting of at least a wireless node and at least a user equipment, UE. The method comprising: Receiving a configuration from the network, by the wireless node, a first CORESET associated with the first SS set and a second CORESET associated with the second SS set, wherein the first and the second SS sets are linked; and Receiving and attempting to decode PDCCHs from the first and the second set under the condition that some SS set configuration parameters are the same in the first and second set respectively.

Certain embodiments may provide one or more of the following technical advantage(s). Some embodiments might provide a simple way for linking PDCCH candidates in two SS sets to support both intra-slot and inter-slot PDCCH repetition in either TDM or FDM manner.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 5A and 5B illustrate methods performed by a wireless device for linking PDCCH candidates in two linked SS sets, according to some embodiments of the present disclosure;

FIGS. 6A and 6B illustrate methods performed by a base station for linking PDCCH candidates in two linked SS sets, according to some embodiments of the present disclosure;

FIG. 8 illustrates an example of linked PDCCH candidates in two SS sets having the same monitoring slot, according to some embodiments of the present disclosure;

FIG. 11 shows an example of linked PDCCH candidates in two SS sets with different monitoring slot offsets, according to some embodiments of the present disclosure;

DETAILED DESCRIPTION

Figures 1, 2:
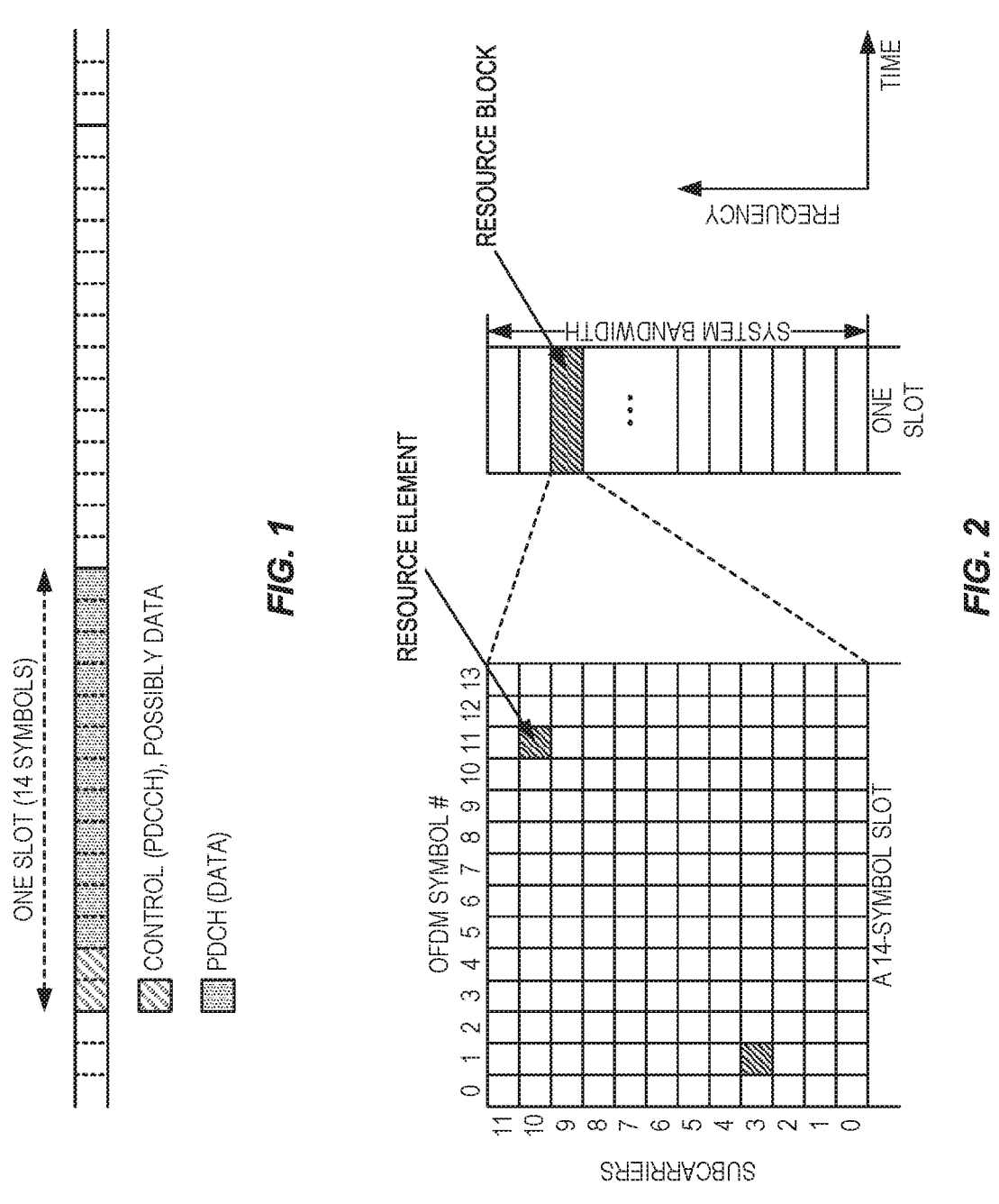
FIG. 1 illustrates that data scheduling in New Radio (NR) is typically in slot basis with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH)
FIG. 2 illustrates the basic NR physical time-frequency resource grid where only one Resource Block (RB) within a 14-symbol slot is shown.
Figure 3:
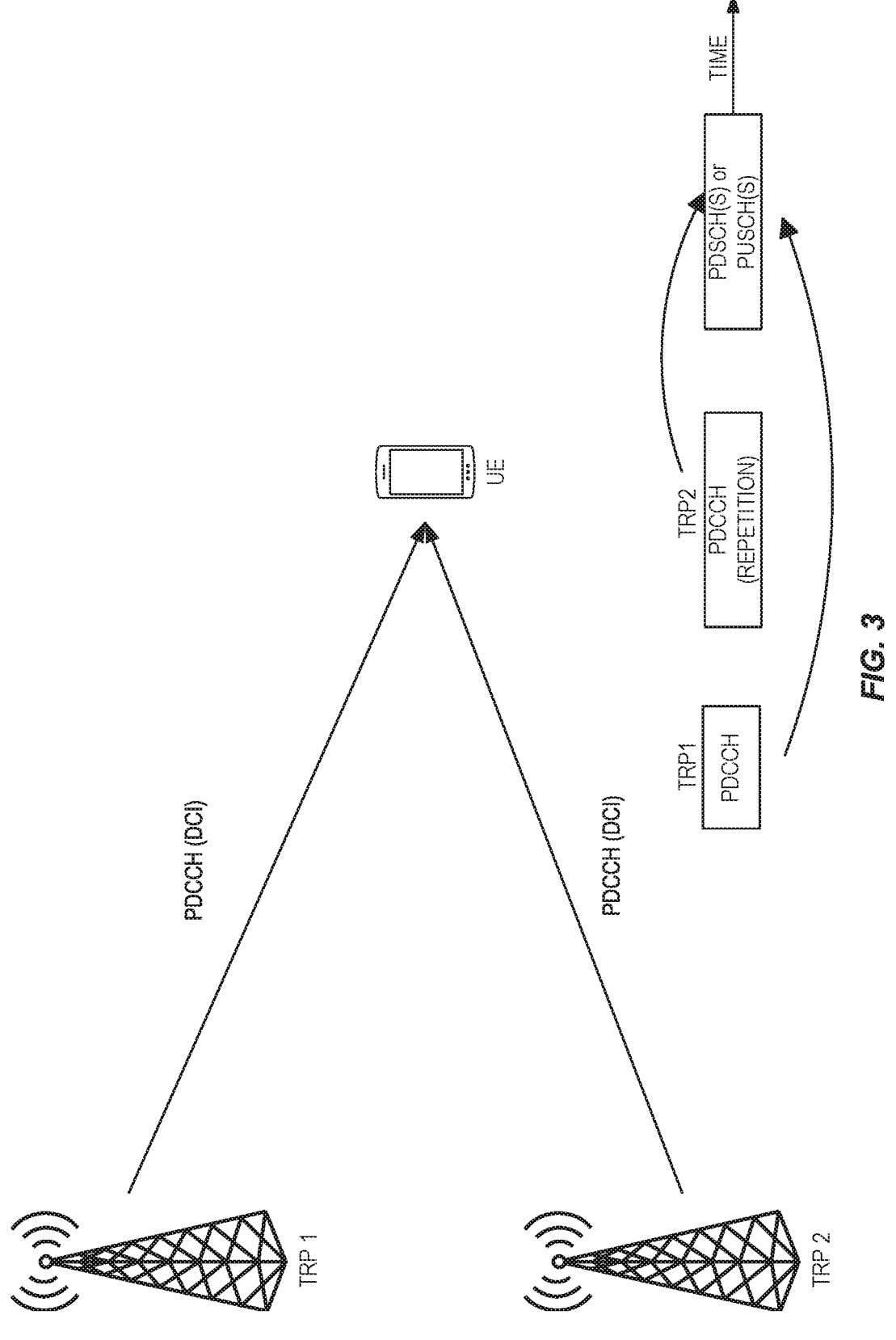
FIG. 3 illustrates an example where a PDCCH is repeated over two TRPs at different times, both containing the same DCI.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple Transmit/Receive Point (multi-TRP) operation, a serving cell can schedule UE from two TRPs, providing better PDSCH coverage, reliability and/or data rates. There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
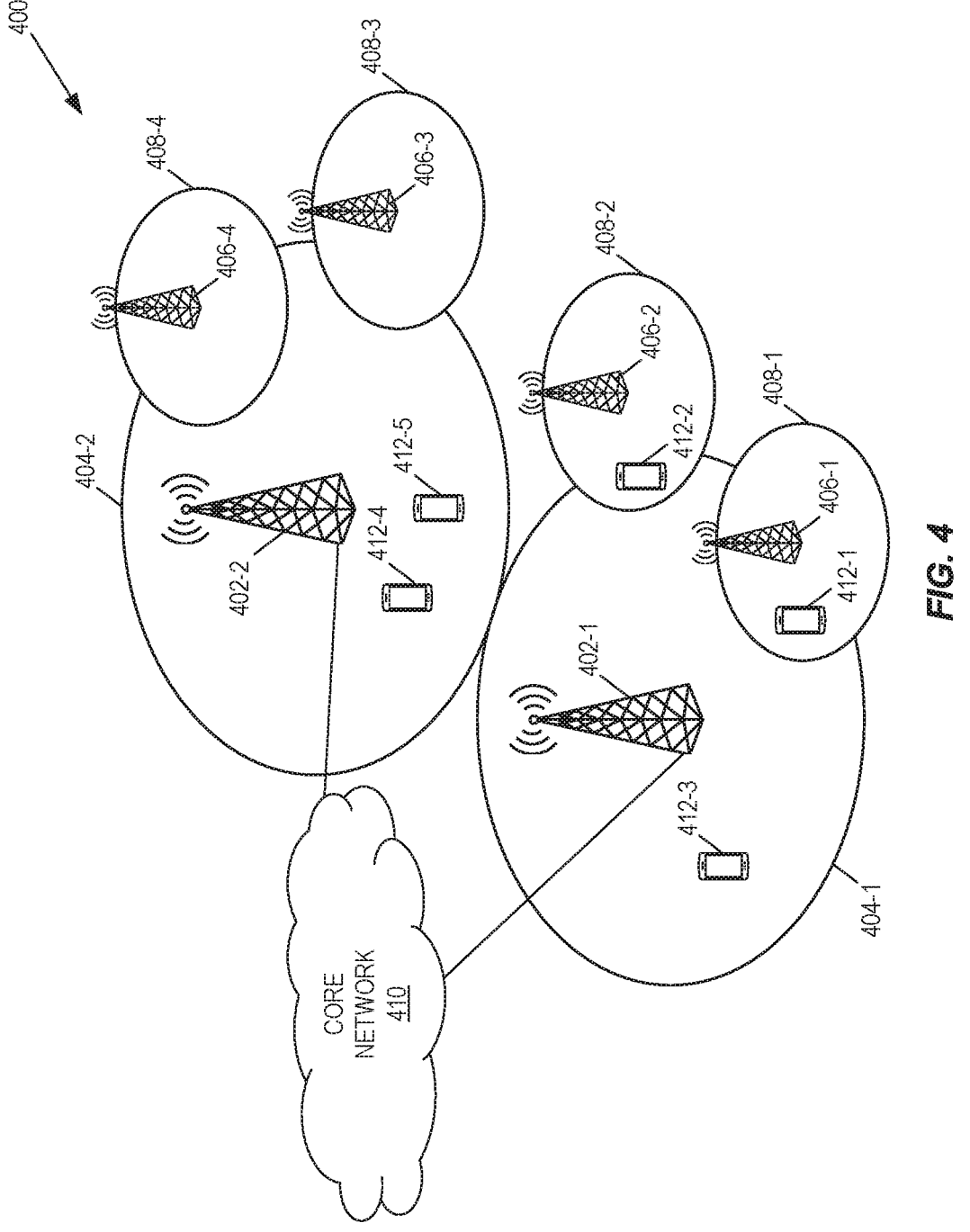
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC). In this example, the RAN includes base stations 402-1 and 402-2, which in the 5GS include NR base stations (gNBs) and optionally next generation eNBs (ng-eNBs) (e.g., LTE RAN nodes connected to the 5GC), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406.

Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

There currently exist certain challenges. Since two linked SS sets can be configured with different parameters such as PDCCH monitoring period and slot offset, how to link PDCCH candidates in the two linked SS sets is an issue. Improved systems and methods for linking PDCCH candidates are needed.

Systems and methods for linking Physical Downlink Control Channel (PDCCH) candidates are provided herein. In some embodiments, a method includes: receiving a configuration of a first and second Control Resource Set (CORESET) associated with a first and second Search Space (SS) set; determining that the first and second SS set are configured with a common set of parameters; activating the first and second CORESET with a first and second TCI state; linking a first PDCCH candidate in a first PDCCH monitoring occasion to a second PDCCH candidate in a second PDCCH monitoring occasion; receiving a PDCCH in the first PDCCH candidate and the PDCCH in the second PDCCH candidate; and detecting the PDCCH in the first and the second PDCCH candidates. Some embodiments might provide a simple way for linking PDCCH candidates in two SS sets to support both intra-slot and inter-slot PDCCH repetition in either TDM or FDM manner.

FIG. 5A illustrates a method performed by a wireless device for linking PDCCH candidates in two linked SS sets. The method includes one or more of: receiving (step 500A), from a wireless node, a configuration of a first Control Resource Set, CORESET associated with a first SS set and a second CORESET associated with a second SS set; determining (step 502A) that the first SS set and the second SS set are configured with a common set of parameters comprising one or more of: a PDCCH monitoring periodicity of k_s slots; a number of PDCCH candidates $$M_s^{(L)}$$

per aggregation level L; a SS set type of either a Common Search Space, CSS, set or a UE Specific Search Space, USS, set; and DCI formats to monitor; activating (step 504A) the first CORESET with a first TCI state and the second CORESET with a second TCI state; linking (step 506A) a first PDCCH candidate in a first PDCCH monitoring occasion in a first slot of the first SS set to a second PDCCH candidate in a second PDCCH monitoring occasion in a second slot of the second SS set; receiving (step 508A), from the wireless node, a PDCCH in the first PDCCH candidate and the PDCCH in the second PDCCH candidate; and detecting (step 510A) the PDCCH in the first and the second PDCCH candidates.

Figure 5B:
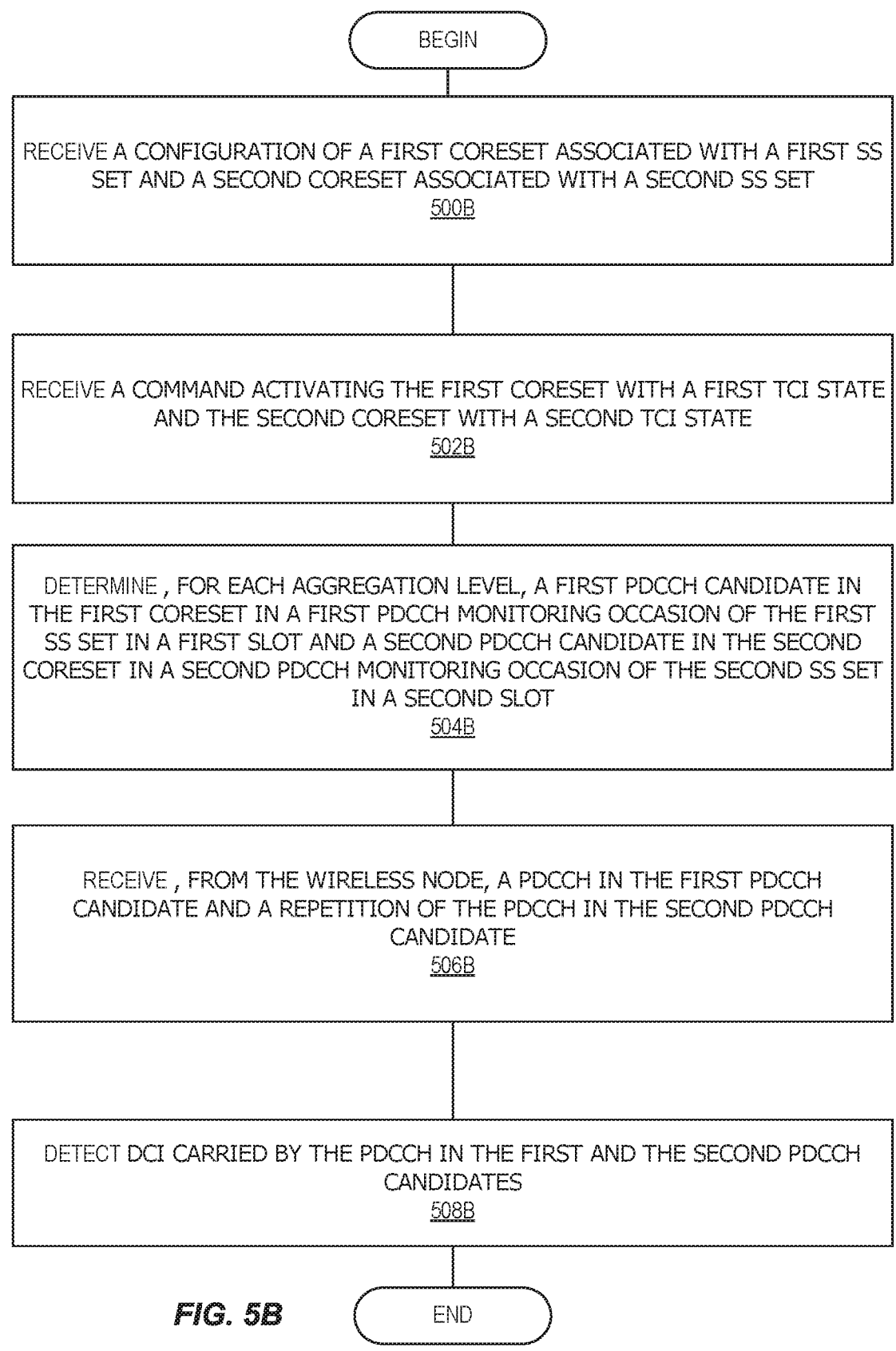

FIG. 5B illustrates a method performed by a wireless device for linking PDCCH candidates in two linked SS sets. The method includes receiving (step 500B), from a wireless node, a configuration of a first CORESET associated with a first SS set and a second CORESET associated with a second SS set, wherein the first and second SS sets are linked, and the first SS set and the second SS set are configured with a common set of parameters comprising one or more of: a PDCCH monitoring periodicity of k_s slots; a PDCCH monitoring offset of o_s slots; a number of PDCCH candidates $$M_s^{(L)}$$

per aggregation level L; a duration of T_s slots; a number of starting symbols or PDCCH monitoring occasions per slot; a SS set type of either a Common Search Space, CSS, set or a user equipment, UE, Specific Search Space, USS, set; and Downlink Control Information, DCI, formats to monitor; receiving a command activating the first CORESET with a first TCI state and the second CORESET with a second TCI state (step 502B); determining, for each aggregation level, a first PDCCH candidate in the first CORESET in a first PDCCH monitoring occasion of the first SS set in a first slot and a second PDCCH candidate in the second CORESET in a second PDCCH monitoring occasion of the second SS set in a second slot (step 504B); receiving, from the wireless node, a PDCCH in the first PDCCH candidate and a repetition of the PDCCH in the second PDCCH candidate (step 506B); and detecting DCI carried by the PDCCH in the first and the second PDCCH candidates (step 508B).

FIG. 6A illustrates a method performed by a base station for linking PDCCH candidates in two linked SS sets. The method includes one or more of: configuring (step 600A), a wireless node, with a configuration of a first Control Resource Set, CORESET, associated with a first SS set and a second CORESET associated with a second SS set; configuring (step 602A) the first SS set and the second SS set with a common set of parameters comprising one or more of: a PDCCH monitoring periodicity of k_s slots; a number of PDCCH candidates $$M_s^{(L)}$$

per aggregation level L; a SS set type of either a Common Search Space, CSS, set or a UE Specific Search Space, USS, set; and Downlink Control Information, DCI, formats to monitor; activating (step 604A) the first CORESET with a first TCI state and the second CORESET with a second TCI state; linking (step 606A) a first PDCCH candidate in a first PDCCH monitoring occasion in a first slot of the first SS set to a second PDCCH candidate in a second PDCCH monitoring occasion in a second slot of the second SS set; and transmitting (step 608A), to the wireless node, a PDCCH in the first PDCCH candidate and the PDCCH in the second PDCCH candidate.

FIG. 6B illustrates a method performed by a base station for linking PDCCH candidates in two linked SS sets. The method includes: configuring (step 600B), a wireless node, with a configuration of a first CORESET associated with a first SS set and a second CORESET associated with a second SS set, wherein the first and second SS sets are linked; configuring (step 602B) the first SS set and the second SS set with a common set of parameters comprising one or more of:

a PDCCH monitoring periodicity of $k_s$ slots; a PDCCH monitoring offset of $o_s$ slots; a duration of T_s slots; a number of starting symbols or PDCCH monitoring occasions per slot; a number of PDCCH candidates $$M_s^{(L)}$$

per aggregation level L; a SS set type of either a Common Search Space, CSS, set or a user equipment, UE, Specific Search Space, USS, set; and Downlink Control Information, DCI, formats to monitor; activating the first CORESET with a first TCI state and the second CORESET with a second TCI state (step 604B); determining, for each aggregation level, a first PDCCH candidate in the first CORESET in a first PDCCH monitoring occasion of the first SS set in a first slot and a second PDCCH candidate in the second CORESET in a second PDCCH monitoring occasion of the second SS set in a second slot (step 606B); and transmitting, to the wireless node, a PDCCH in the first PDCCH candidate and the same PDCCH in the second PDCCH candidate (step 608B).

For discussion purposes, it is assumed that two linked SS sets, SS set #1 and SS set #2, are configured for a UE. SS set #1 and SS set #2 are associated with CORESET #1 and CORESET #2, respectively. CORESET #1 and CORESET #2 are activated with TCI state #1 and TCI state #2, respectively. The linkage may be done by configuring from the network to the UE an explicit indicator in each of the two configured SS sets to indicate the linkage between the two SS sets. For example, the indicator can be a SS set ID in an SS set that points to the linked SS set. Alternatively, an identifier value is configured in each SS set and SS sets configured with the same value are then assumed by the UE to be linked together.

Linking PDCCH Candidates in Two SS Sets in a Same Slot

For the PDCCH candidates of the two or more SS sets that are linked, in one embodiment, the two or more SS sets are configured with the same slots for PDCCH monitoring, i.e., same (or common) configuration for one or more of the following parameters:

PDCCH monitoring periodicity of $k_s$ slots and PDCCH monitoring offset of $o_s$ slots Duration of $T_s < k_s$ slots indicating a number of slots that the search space set exists Number of PDCCH candidates $$M_s^{(L)}$$

per CCE aggregation level L

Either a CSS set or a USS set

DCI formats to monitoring

Number of starting symbols of the corresponding CORESET.

A UE configured by the network to use a link between two or more SS sets (or PDCCH candidates), can (or shall) assume that at least one of the parameter configurations listed above is the same for these two or more SS sets. Hence, the UE is not expected to be configured by the network with two or more SS sets that are linked, where one or more parameters in the list above are configured differently.

Figure 7:
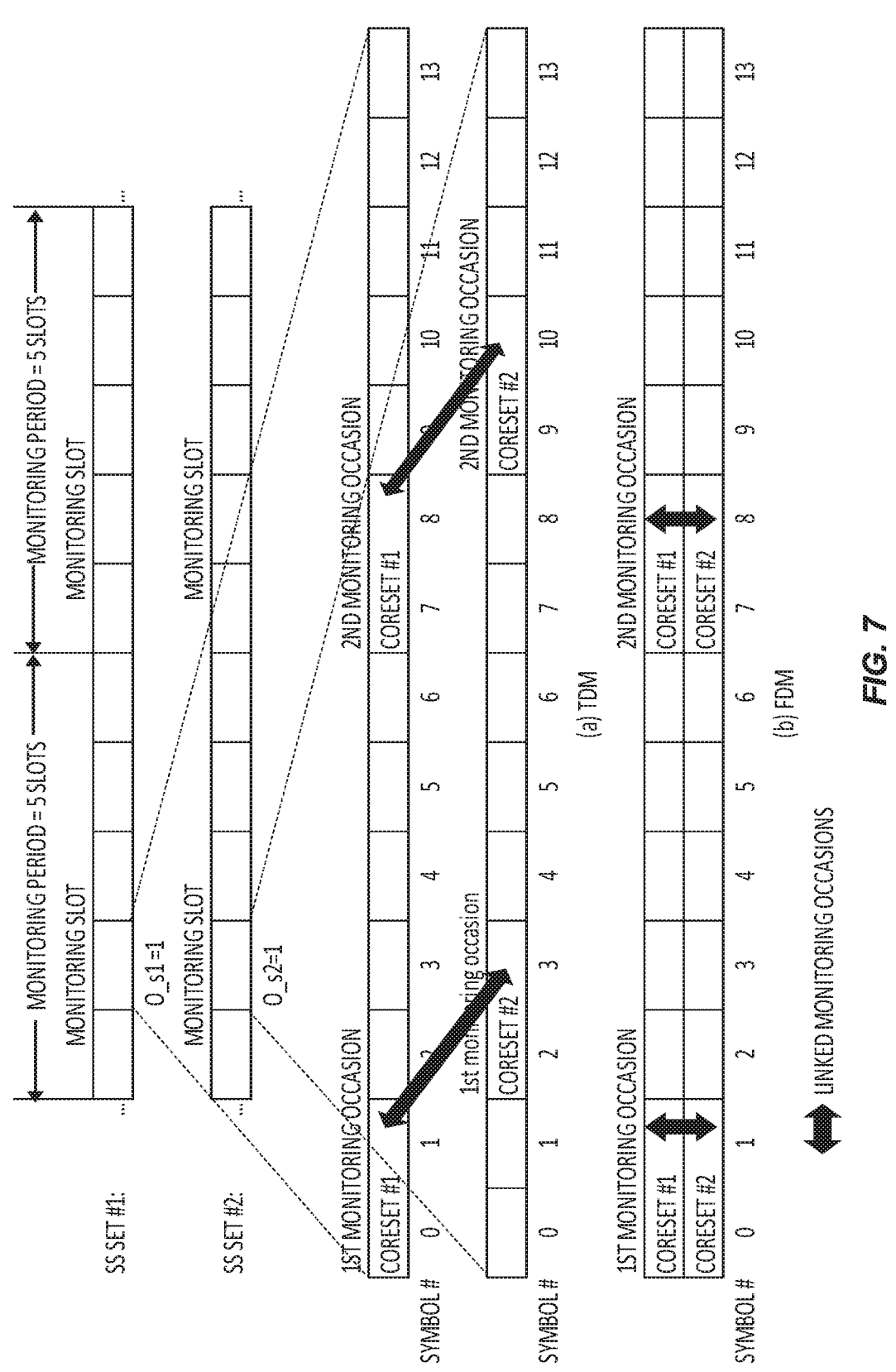
FIG. 7 illustrates an example of linking intra-slot PDCCH candidates in two SS sets, according to some embodiments of the present disclosure.

FIG. 7: An example of linking intra-slot PDCCH candidates in two SS sets. FIG. 7 shows an example of configuring two SS sets. In this example, both the two SS sets are configured with a same PDCCH monitoring periodicity of $k_s$=5 slots, a same slot offset of 1, i.e., $o_{s1}$=$o_{s2}$=1, and a same duration of Ts=1 slot. Within each monitoring slot, both the SS sets are configured with two starting symbols. In FIG. 7 (*a*), the two SS sets are configured with different starting symbols of the associated CORESET, i.e., symbols 0 and 7 for SS set #1, and symbols 2 and 9 for SS set #2. Each of the starting symbol defines a PDCCH monitoring occasion in a monitoring slot in each SS set. In this example, each CORESET is configured with a duration of two symbols and thus, each monitoring occasion spans over 2 symbols. The first monitoring occasion in SS set #1 is linked to the first monitoring occasion in SS set 2. Similarly, the second monitoring occasion in SS set #1 is linked to the second monitoring occasion in SS set 2.

The linkage between two PDCCH monitoring occasions in the two SS sets means that for each CCE aggregation level L, PDCCH candidates with a same PDCCH candidate index in the two associated CORESETs are linked. A PDCCH can be repeated in two linked PDCCH candidates. In FIG. 7 (*a*), different starting symbols are configured for the 2 SS sets, thus a PDCCH can be repeated in two linked PDCCH candidates in the 2 SS sets in a time division multiplexing (TDM) manner. In FIG. 7 (*b*), the two SS sets are configured with same starting symbols, and the associated CORESETs are configured in different RBs. In this case, a PDCCH can be repeated in two linked PDCCH candidates in the 2 SS sets in a frequency division multiplexing (FDM) manner.

FIG. 8: An example of linked PDCCH candidates in two SS sets having the same monitoring slot. As an example, FIG. 8 shows the linked PDCCH candidates in two SS sets for each aggregation level, where both CORESETs contain nine CCEs and the two SS sets are configured with 4,2 and 1 PDCCH candidates at aggregation level L=1, 2, 4, respectively.

Linking PDCCH Candidates in Two SS Sets in Different Slots

In another embodiment, the two SS sets are configured with different slot offsets for PDCCH monitoring, but with the same configuration for one or more of the following parameters:

PDCCH monitoring periodicity of $k_s$ slots

Duration of $T_s < k_s$ slots indicating a number of slots that the search space set exists Number of PDCCH candidates $$M_s^{(L)}$$

per CCE aggregation level L

Either a CSS set or a USS set

DCI formats to monitoring

Number of starting symbols of the corresponding CORESET.

The UE is not expected to be configured by the network with two or more SS sets that are linked, and where the slot offset is configured different for two of the SS sets, and where one or more parameters in the list above are configured differently.

Figure 9:
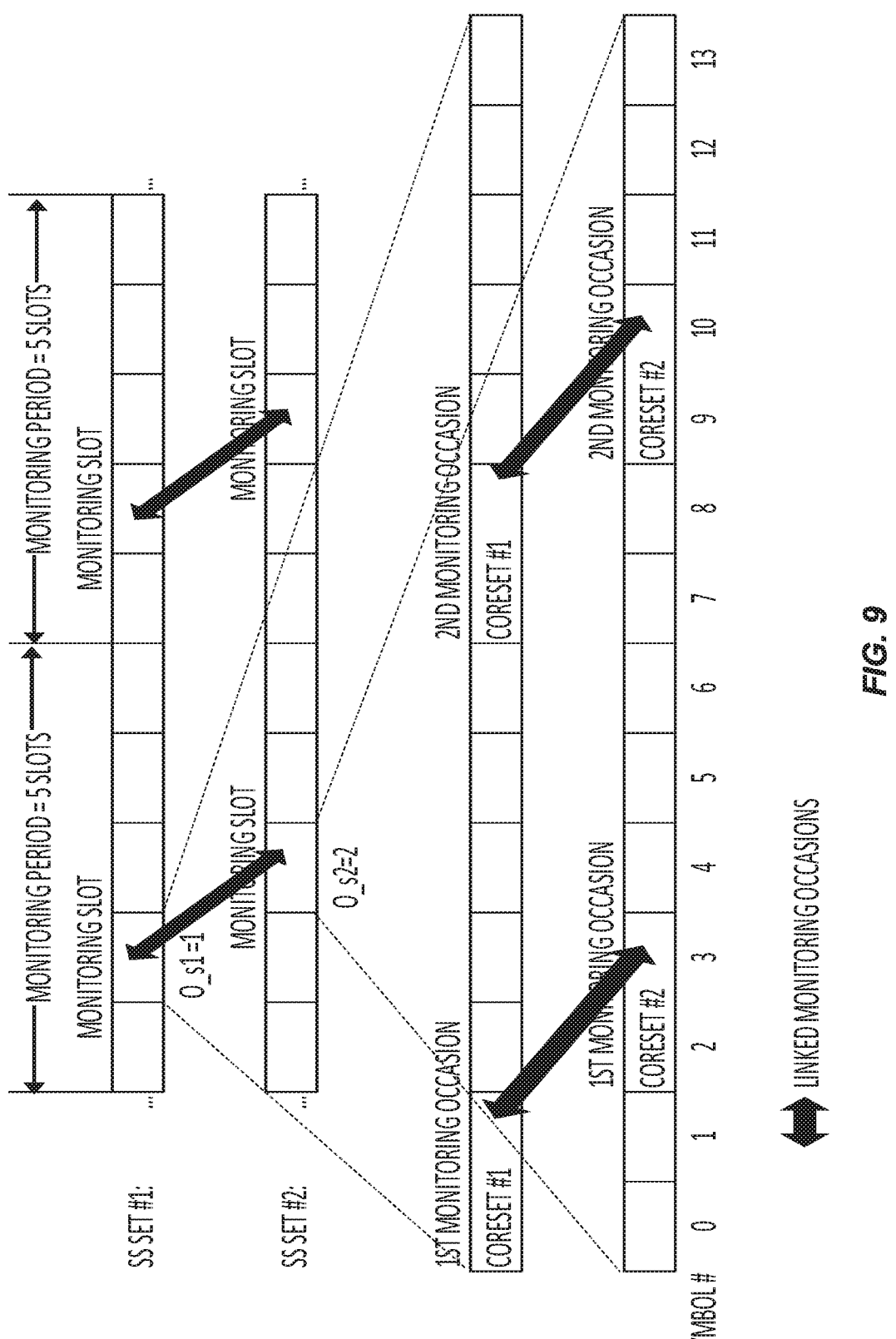
FIG. 9 illustrates an example of linking inter-slot PDCCH candidates in two SS sets, according to some embodiments of the present disclosure.

FIG. 9: An example of linking inter-slot PDCCH candidates in two SS sets. FIG. 9 shows an example of configuring two SS sets with a same PDCCH monitoring periodicity of $k_s$=5 slots and duration Ts=1, but different slot offsets $O_{s1}$=1 and $O_{s2}$=2, respectively. Within each monitoring slot, both the SS sets are configured with two starting symbols, i.e., symbols 0 and 7 in SS set #1 and symbols 2 and 9 in SS set #2, the two starting symbols are associated with two PDCCH monitoring occasions in each of the two SS sets. The first monitoring occasion in SS set #1 is linked to the first monitoring occasion in SS set #2. The second monitoring occasion in SS set #1 is linked to the second monitoring occasion in SS set #2.

Figure 10:
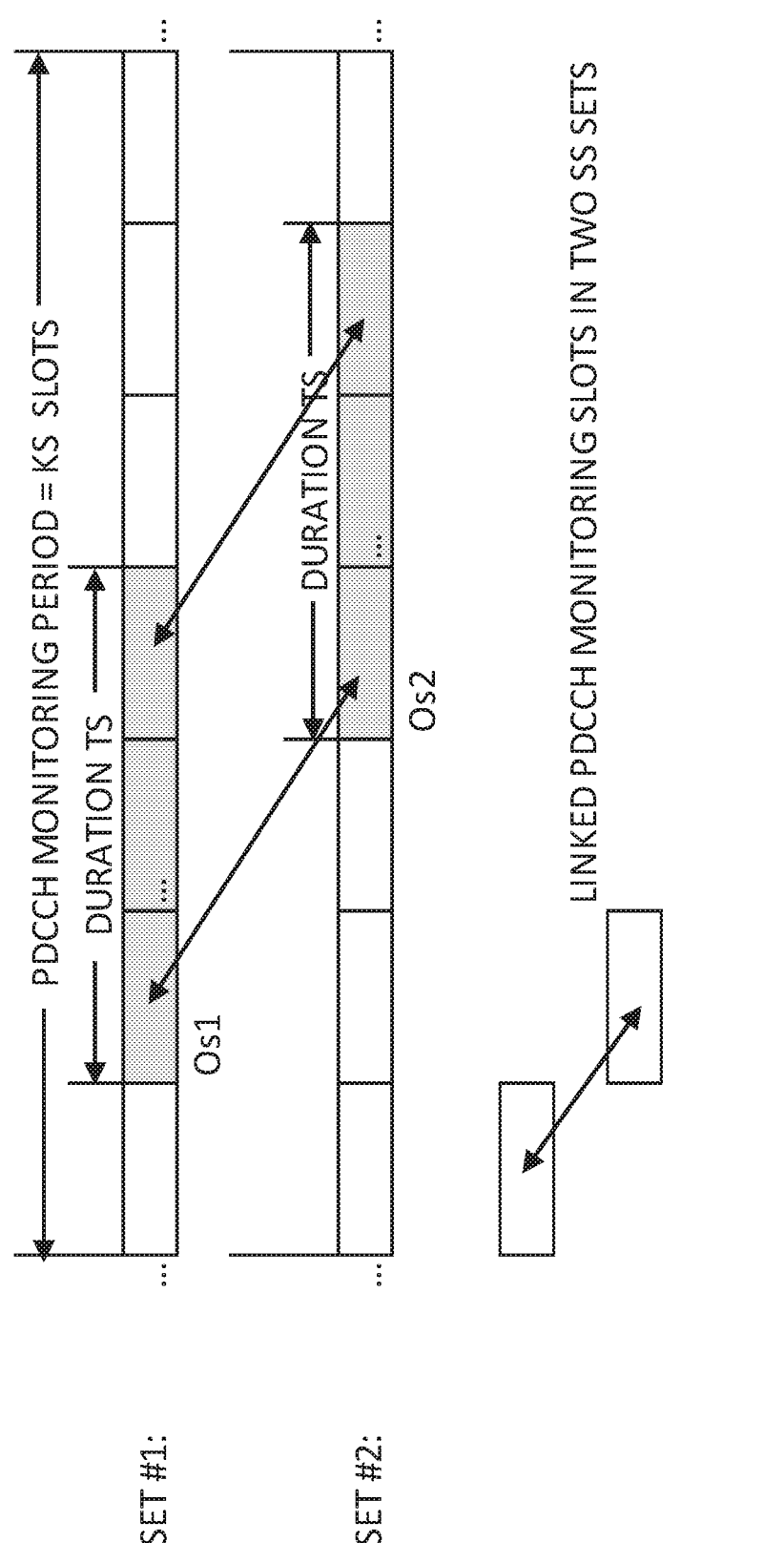
FIG. 10 illustrates an example of associating PDCCH monitoring slots in two SS sets configured with a same PDCCH monitoring period Ks and duration Ts, according to some embodiments of the present disclosure.

In general, if the two linked SS sets have different slot offsets, the PDCCH candidates of the two CORESETs at each of the starting symbols in two associated PDCCH monitoring slots are linked. Two linked monitoring slots in two linked SS sets have the same starting slot within a monitoring duration in a same monitoring period, in each of the two SS sets. This is illustrated in FIG. 10: An example of associating PDCCH monitoring slots in two SS sets configured with a same PDCCH monitoring period Ks and duration Ts. Let $n_1$ be the slot in the first SS set and $n_2$ be the slot in the second SS set, the two slots are linked if they satisfy $n_1=nK_s+O_{s1}+i$ and $n_2=nK_s+O_{s2}+i$, where n is an integer and $i=0, 1, \ldots, T_s-1$.

FIG. 11 shows an example of linked PDCCH candidates in two SS sets with different monitoring slot offsets, i.e., $O_{s1}=1$ and $O_{s2}=2$, where both CORESETs contain nine CCEs and the two SS sets are configured with 4, 2 and 1 PDCCH candidates at aggregation level $L=1, 2, 4$, respectively.

Linking PDCCH Candidates in Two SS Sets with Different Duration

In another embodiment, the two SS sets are configured with different durations. Let $T_{s1}$ and $T_{s2}$ denote the number of slots over which search space sets 1 and 2 exist, respectively. Assuming the same PDCCH monitoring periodicity of $k_s$ slots is configured for both search space sets, we have $T_{s1}<k_s$ and $T_{s2}<k_s$. As for the other parameters configured to search space sets 1 and 2, one or more of the following parameters may be configured to be the same:

PDCCH monitoring periodicity of k_s slots
Number of PDCCH candidates $$M_s^{(L)}$$

per CCE aggregation level L
Either a CSS set or a USS set
DCI formats to monitoring
Number of starting symbols of the corresponding CORESET.

Figure 12:
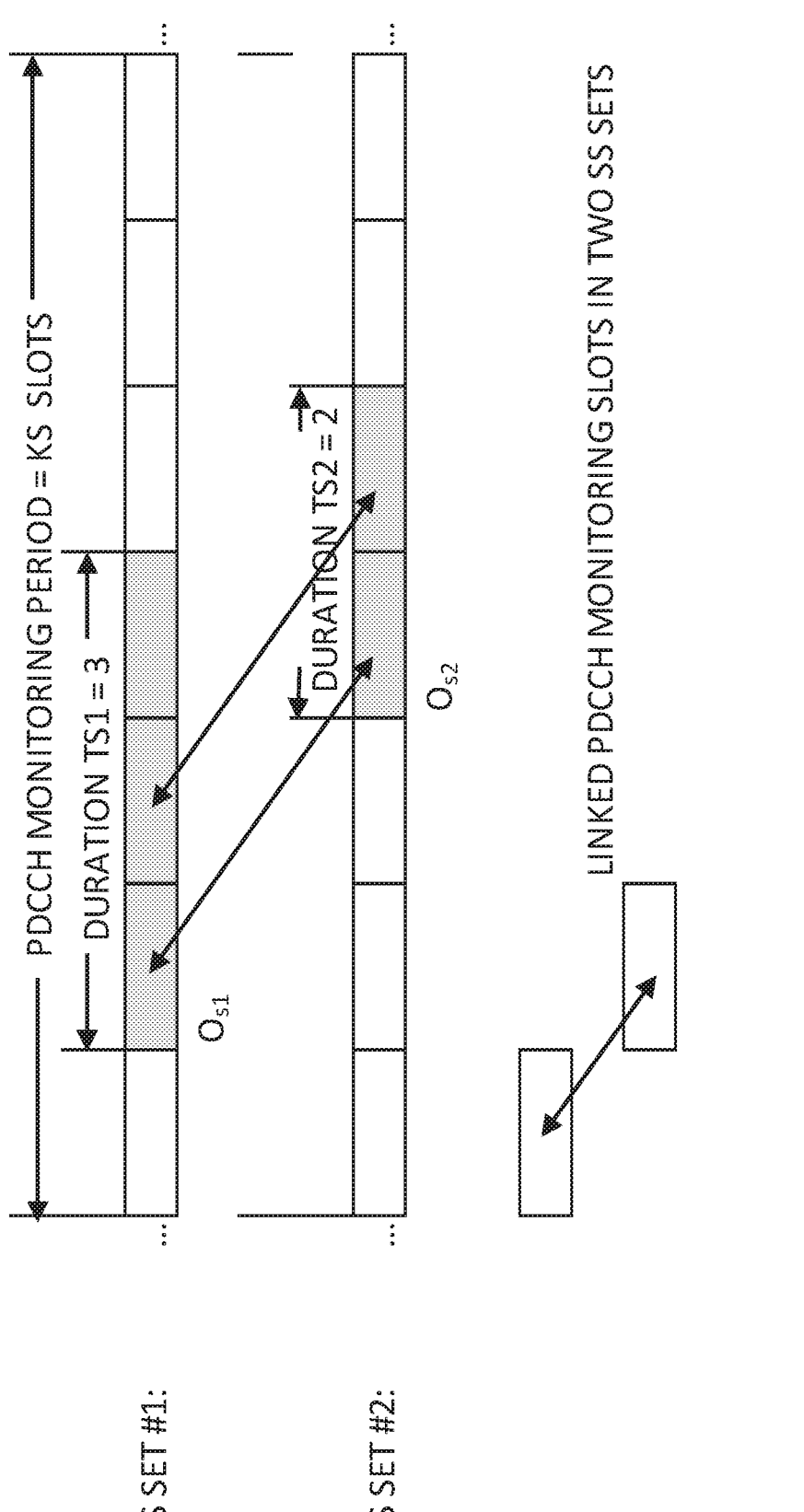
FIG. 12 illustrates an example of associating PDCCH monitoring slots in two SS sets configured with a same PDCCH monitoring period Ks and different durations $T_{s1}$ and $T_{s2}$, according to some embodiments of the present disclosure.

FIG. 12: An example of associating PDCCH monitoring slots in two SS sets configured with a same PDCCH monitoring period Ks and different durations $T_{s1}$ and $T_{s2}$. FIG. 12 shows an example of configuring two SS sets with a same PDCCH monitoring periodicity of $k_s=5$ slots and different durations Ts1=3 and Ts2=2. The two SS sets are also configured with different slot offsets $O_{s1}=1$ and $O_{s2}=2$, respectively. Let n denote the nth slot in either SS set within the respective SS set duration. That is, for SS set 1, n=1, 2, \ldots, $T_{s1}$, and for SS set 2, n=1, 2, \ldots, Ts2. Then, the nth slot within the SS set durations of the two SS sets are linked where n=1, 2, \ldots, $\min(T_{s1}, T_{s2})$. In the example of FIG. 12, the 1st slot within duration $T_{s1}$ of SS set 1 is linked to the 1st slot within duration $T_{s2}$ of SS set 2. Similarly, the 2nd slot within duration $T_{s1}$ of SS set 1 is linked to the 2nd slot within duration $T_{s2}$ of SS set 2. PDCCH can be repeated in these two linked slots. However, the 3rd slot within duration $T_{s1}$ of SS set 1 is not linked to any slot in SS set 2 since the duration of SS set 2 is lower than the duration of SS set 1

(i.e., $T_{s2}<T_{s1}$). As a result, PDCCH received in the 3rd slot within duration $T_{s1}$ of SS set 1 is not repeated.

Similarly, when the number of starting symbols of the corresponding CORESET in the two SS sets is configured with different values, N_s1 and N_s2, for two linked PDCCH monitoring slots in the two SS sets, only the first min(N_s1, N_s2) PDCCH monitoring occasions in the two SS sets are linked.

Determining the Last Symbol of a PDCCH

Figure 13:
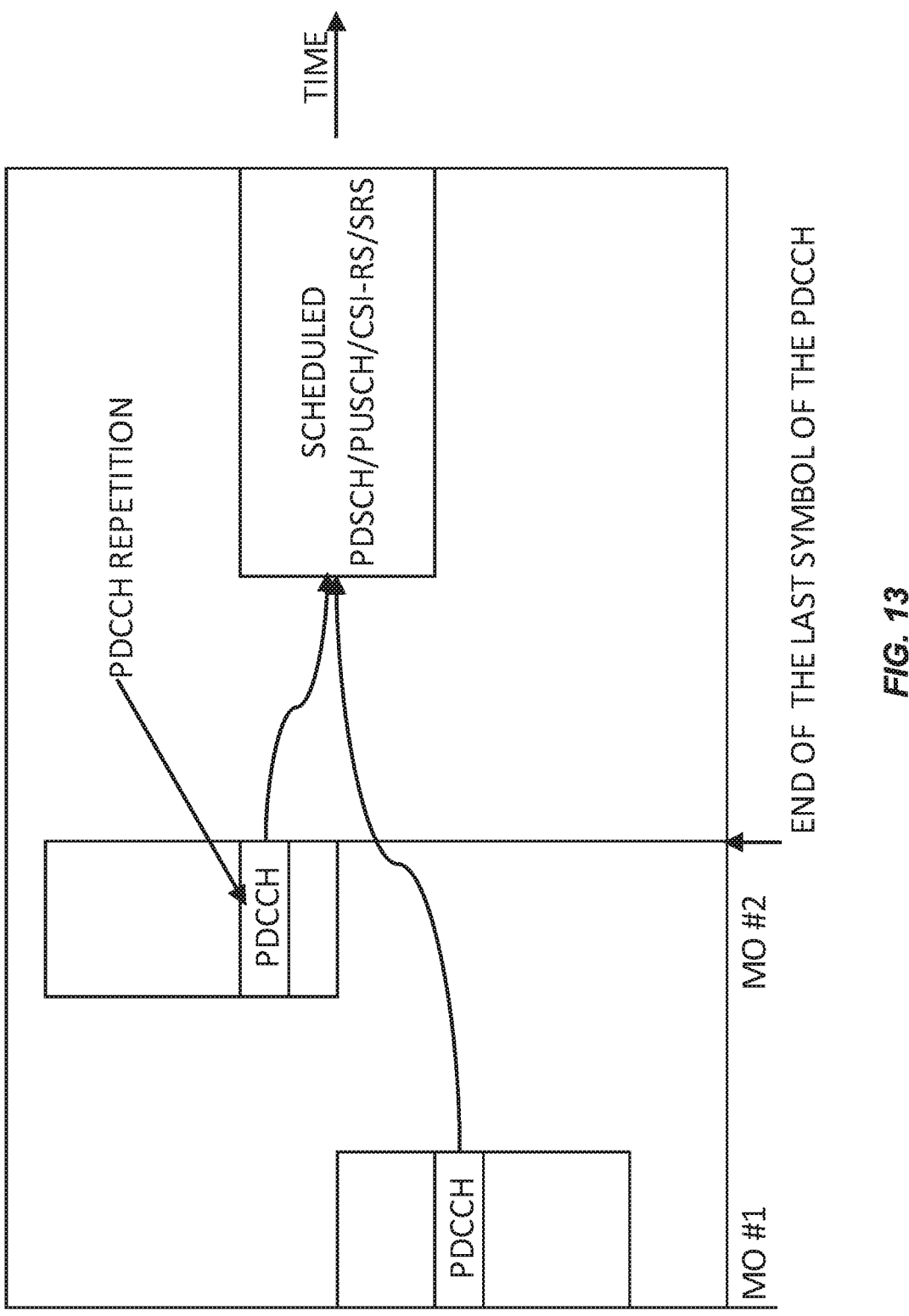
FIG. 13 illustrates an example where, regardless of over which PDCCH candidate the PDCCH is detected, the last symbol of the PDCCH is always defined as the last symbol of the PDCCH candidate occurring latest in time among the linked PDCCH candidates, according to some embodiments of the present disclosure.

In a number of scenarios in NR, the last symbol of a PDCCH is used by a UE as a time reference for calculating a time offset between the PDCCH and the scheduled PDSCH/PUSCH/CSI-RS/SRS. When a PDCCH is repeated in two PDCCH candidates, the last symbol of the PDCCH needs to be clearly defined. In one embodiment, regardless of over which PDCCH candidate the PDCCH is detected, the last symbol of the PDCCH is always defined as the last symbol of the PDCCH candidate occurring latest in time among the linked PDCCH candidates as shown in FIG. 13.

Determining the First Symbol of a PDCCH

In NR, PDSCH resource is indicated with a Start and Length Indicator Value (SLIV) format in a DCI. The number of consecutive symbols L counting from a starting symbol S allocated for a PDSCH are determined from the start and length indicator SLIV as

--- if (L − 1) ≤ 7 then
    SLIV = 14 · (L − 1) + S
else
    SLIV = 14 · (14 − L + 1) + (14 − 1 − S)

--- where $0<L\leq14-S$. The reference point $S_0$ for starting symbol S is defined as:

if configured with referenceOfSLIVDCI-1-2, and when receiving PDSCH scheduled by DCI format 1_2 with CRC scrambled by C-RNTI, MCS-C-RNTI, CS-RNTI with K0=0, and PDSCH mapping Type B, the starting symbol S is relative to the starting symbol S0 of the PDCCH monitoring occasion where DCI format 1_2 is detected;

otherwise, the starting symbol S is relative to the start of the slot using S0=0.

In case of PDCCH repetition in two PDCCH candidates in two different PDCCH monitoring occasions, the starting symbol S should not be relative to the starting symbol S0 of the PDCCH monitoring occasion where DCI format 1_2 is detected. Rather, it should always be relative to one of the two PDCCH monitoring occasions regardless over which one DCI format 1_2 is detected. In one embodiment, the starting symbol S is relative to starting symbol S0 of the PDCCH monitoring occasion occurring later in time.

Determining PUCCH Resource

In case of two linked PDCCH candidates, the indices of the first CCEs for the two PDCCH candidates are generally different. If the two PDCCHs are in two different CORESETs, the number of CCEs in the two CORESETs can also be different.

In one embodiment, the PUCCH resource associated with a scheduled PDSCH is based on the first CCE index of one of the linked PDCCH candidates and the number of CCEs of the corresponding CORESET. The PDCCH candidate used for the determination of PUCCH resource can be the one in a CORESET with the smallest controlResourceSetId or alternatively in a SS set with the smallest searchSpaceId among the linked SS sets.

PDSCH Resource Mapping

In case of two linked PDCCH candidates, if a PDSCH scheduled by the PDCCHs would overlap with resources in each of the CORESET containing PDCCH, the resources corresponding to the two linked PDCCH candidates and the associated PDCCH DM-RS are not available for the PDSCH.

Figure 14:
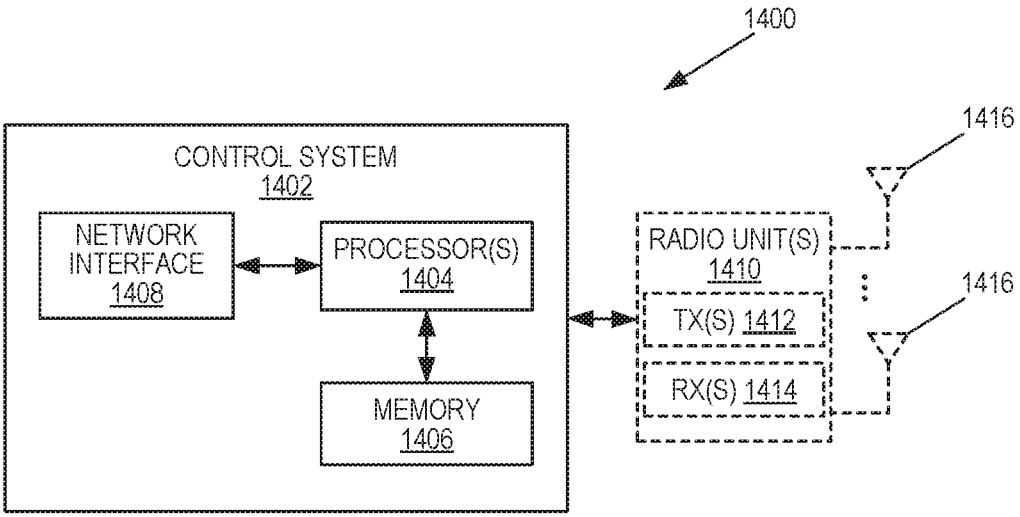
FIGS. 14 through 16 are schematic block diagrams of example embodiments of a radio access node, according to some embodiments of the present disclosure.

FIG. 14 is a schematic block diagram of a radio access node 1400 according to some embodiments of the present disclosure. Optional features are represented by dashed boxes. The radio access node 1400 may be, for example, a base station 402 or 406 or a network node that implements all or part of the functionality of the base station 402 or gNB described herein. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, the radio access node 1400 may include one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein. In some embodiments, the function(s) are implemented in software that is stored, e.g., in the memory 1406 and executed by the one or more processors 1404.

Figure 15:
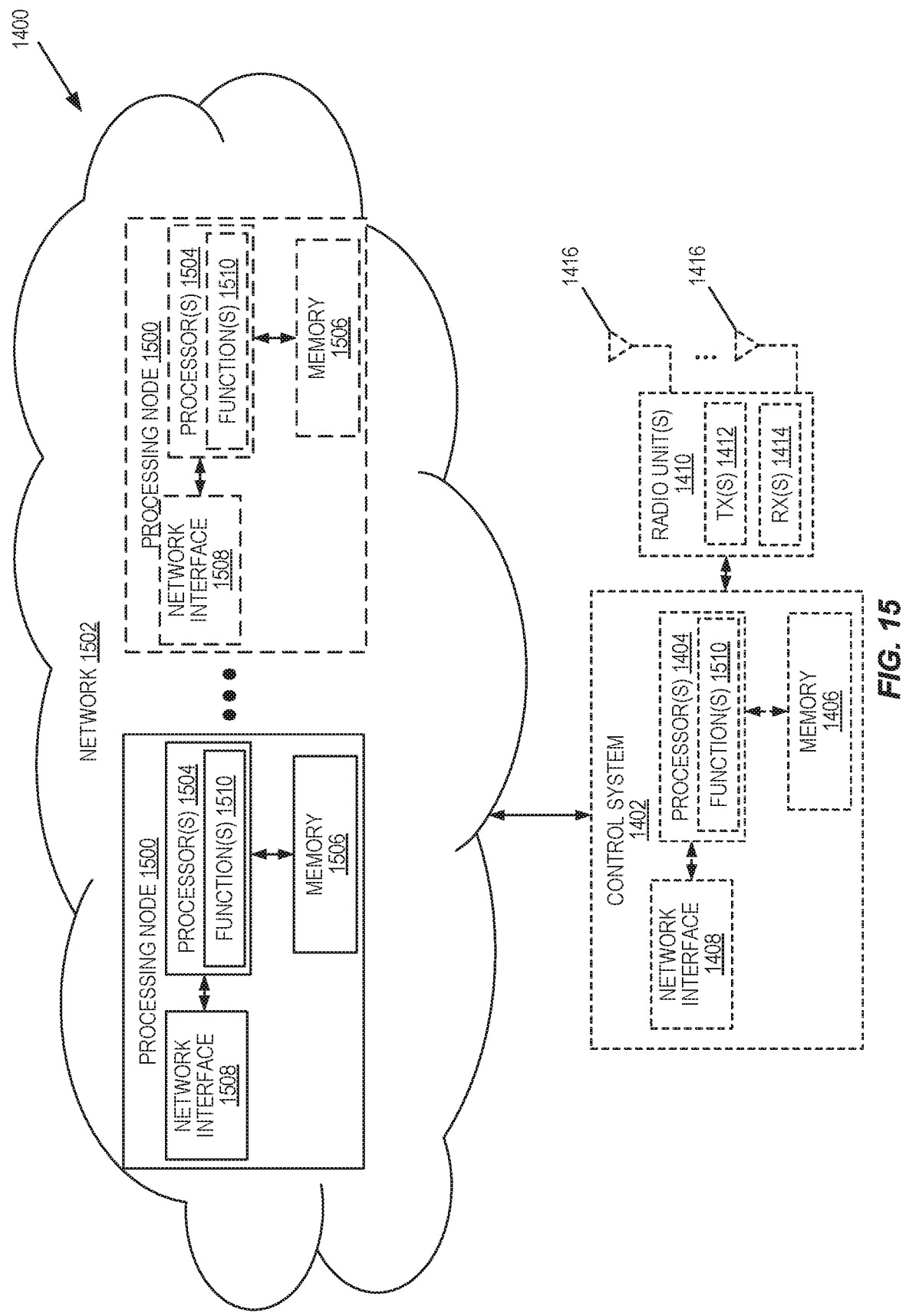

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node(s) in a network(s)). As illustrated, in this example, the radio access node 1400 may include the control system 1402 and/or the one or more radio units 1410, as described above. The control system 1402 may be connected to the radio unit(s) 1410 via, for example, an optical cable or the like. The radio access node 1400 includes one or more processing nodes 1500 coupled to or included as part of a network(s) 1502. If present, the control system 1402 or the radio unit(s) are connected to the processing node(s) 1500 via the network 1502. Each processing node 1500 includes one or more processors 1504 (e.g., CPUs, ASICs, FPGAs, and/or the like), memory 1506, and a network interface 1508.

In this example, functions 1510 of the radio access node 1400 described herein are implemented at the one or more processing nodes 1500 or distributed across the one or more processing nodes 1500 and the control system 1402 and/or the radio unit(s) 1410 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
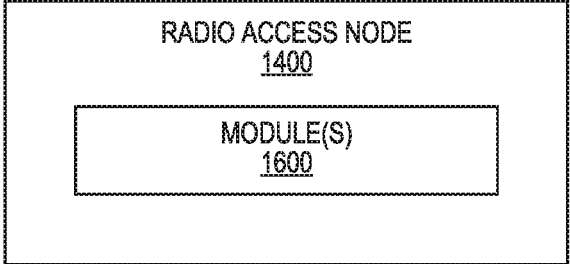

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein. This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
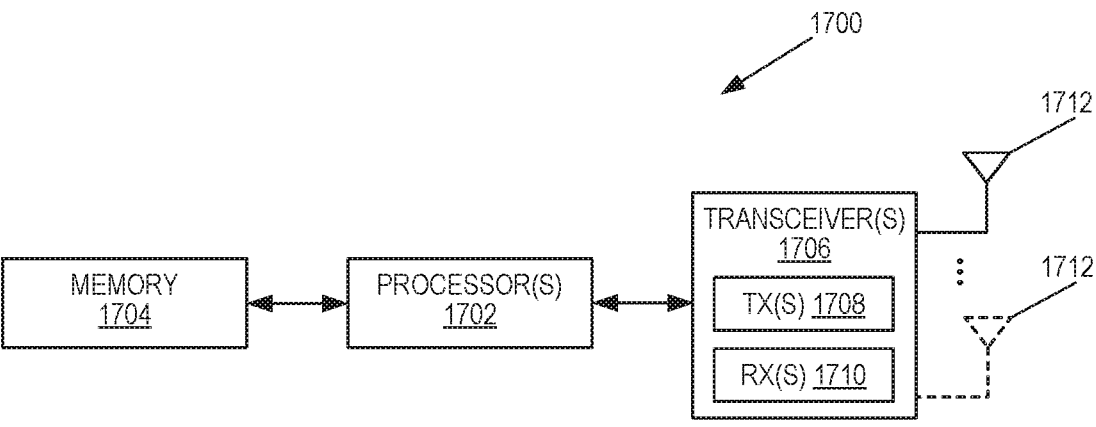
FIGS. 17 and 18 are schematic block diagrams of a UE, according to some embodiments of the present disclosure.

FIG. 17 is a schematic block diagram of a wireless communication device 1700 according to some embodiments of the present disclosure. As illustrated, the wireless communication device 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the wireless communication device 1700 described above may be fully or partially implemented in software that is, e.g., stored in the memory 1704 and executed by the processor(s) 1702. Note that the wireless communication device 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the wireless communication device 1700 and/or allowing output of information from the wireless communication device 1700), a power supply (e.g., a battery and associated power circuitry), etc.

In some embodiments, a computer program including instructions which, when executed by at least one processor, causes the at least one processor to carry out the functionality of the wireless communication device 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
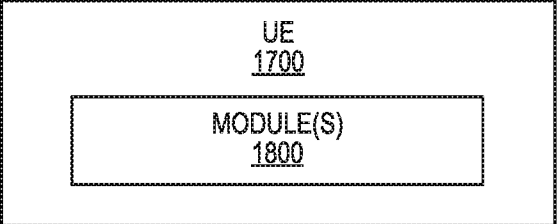

FIG. 18 is a schematic block diagram of the wireless communication device 1700 according to some other embodiments of the present disclosure. The wireless communication device 1700 includes one or more modules 1800, each of which is implemented in software. The module(s) 1800 provide the functionality of the wireless communication device 1700 described herein.

Figure 19:
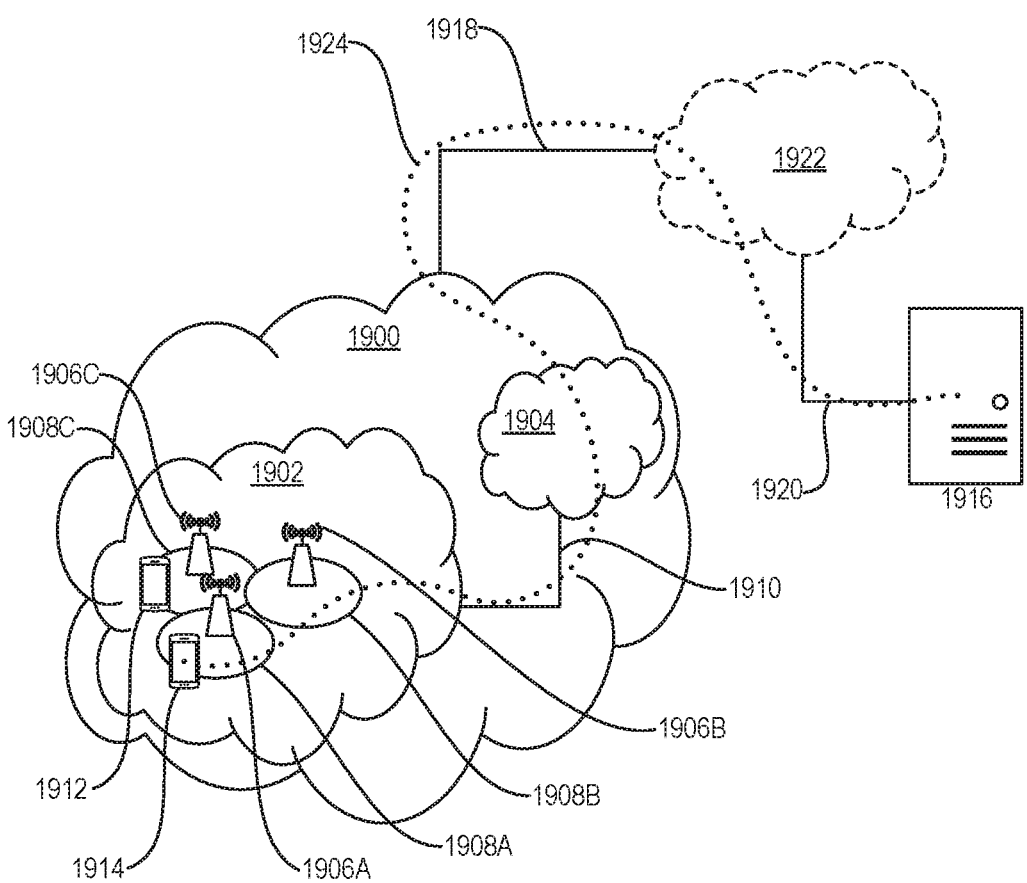
FIG. 19 illustrates an example embodiment of a communication system in which embodiments of the present disclosure may be implemented.

With reference to FIG. 19, in accordance with an embodiment, a communication system includes a telecommunication network 1900, such as a 3GPP-type cellular network, which comprises an access network 1902, such as a RAN, and a core network 1904. The access network 1902 comprises a plurality of base stations 1906A, 1906B, 1906C, such as Node Bs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloud-implemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

Figure 20:
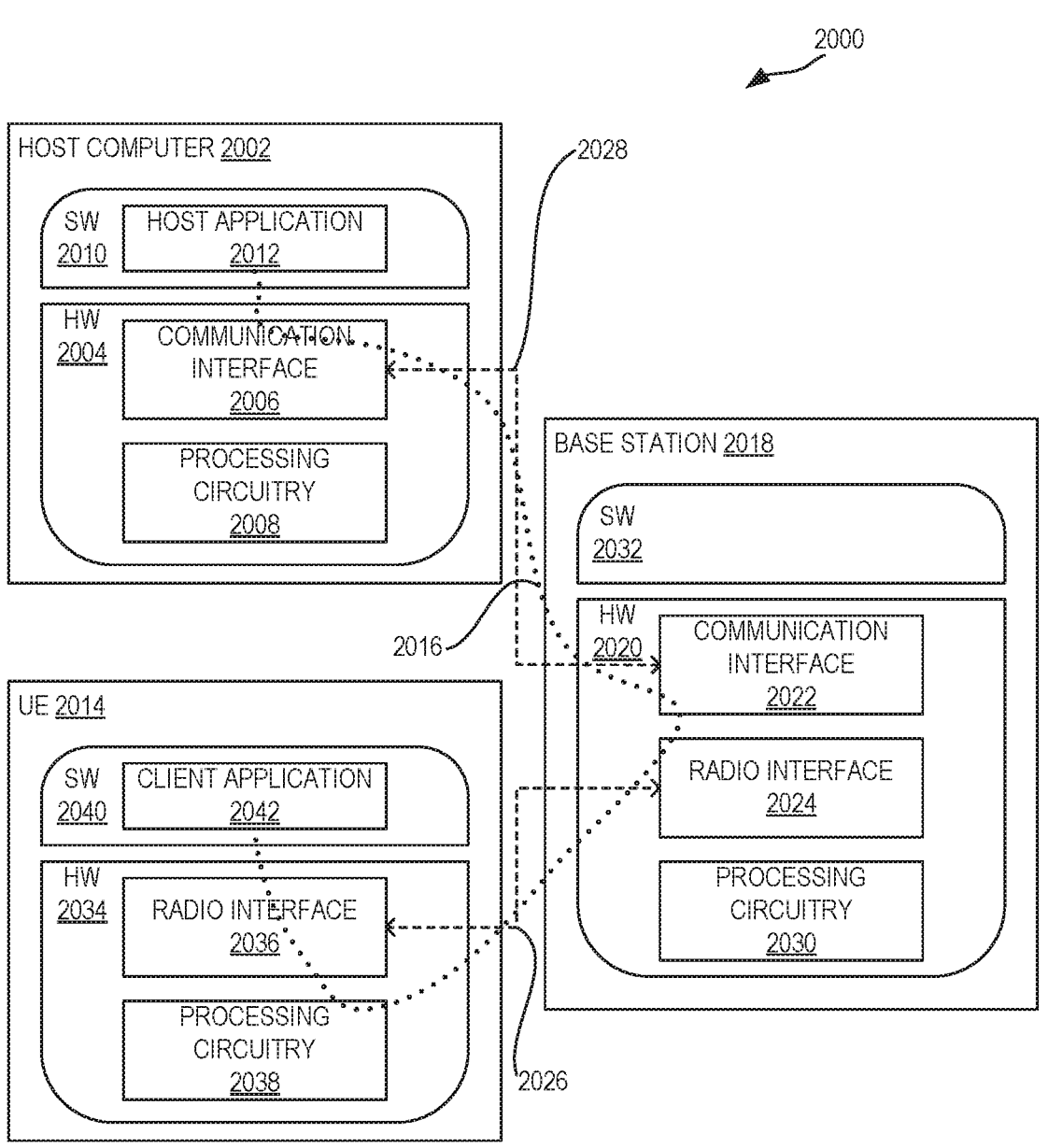
FIG. 20 illustrates example embodiments of the host computer, base station, and UE of FIG. 15, according to some embodiments of the present disclosure.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2018, and it may be unknown or imperceptible to the base station 2018. Such procedures and functionalities may be known and practiced in the art. In certain embodiments, measurements may involve proprietary UE signaling facilitating the host computer 2002's measurements of through-put, propagation times, latency, and the like. The measurements may be implemented in that the software 2010 and 2040 causes messages to be transmitted, in particular empty or 'dummy' messages, using the OTT connection 2016 while it monitors propagation times, errors, etc.

Figures 21, 22:
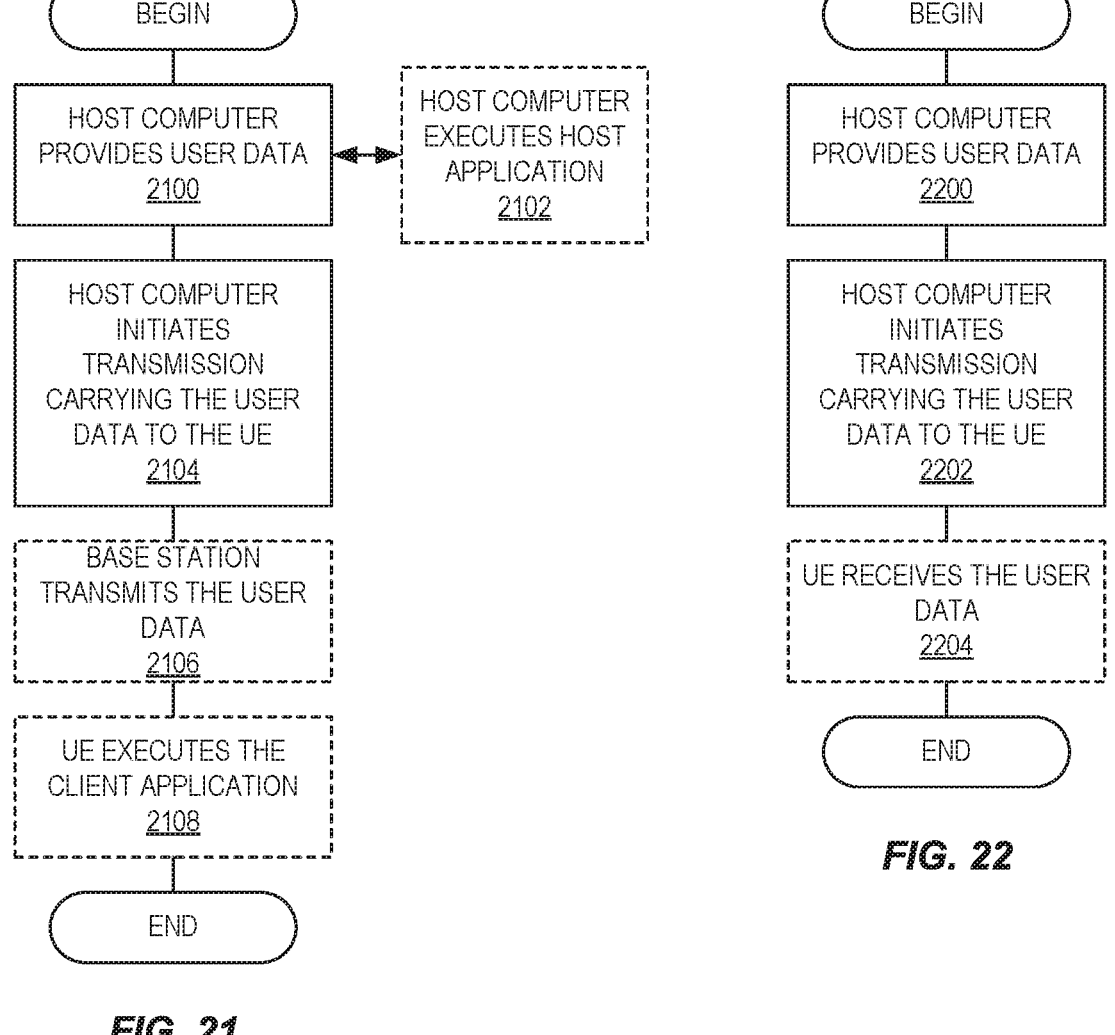
FIGS. 21 through 24 are flow charts that illustrate example embodiments of methods implemented in a communication system such as that of FIG. 20, according to some embodiments of the present disclosure.

FIG. 21 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

Figures 23, 24:
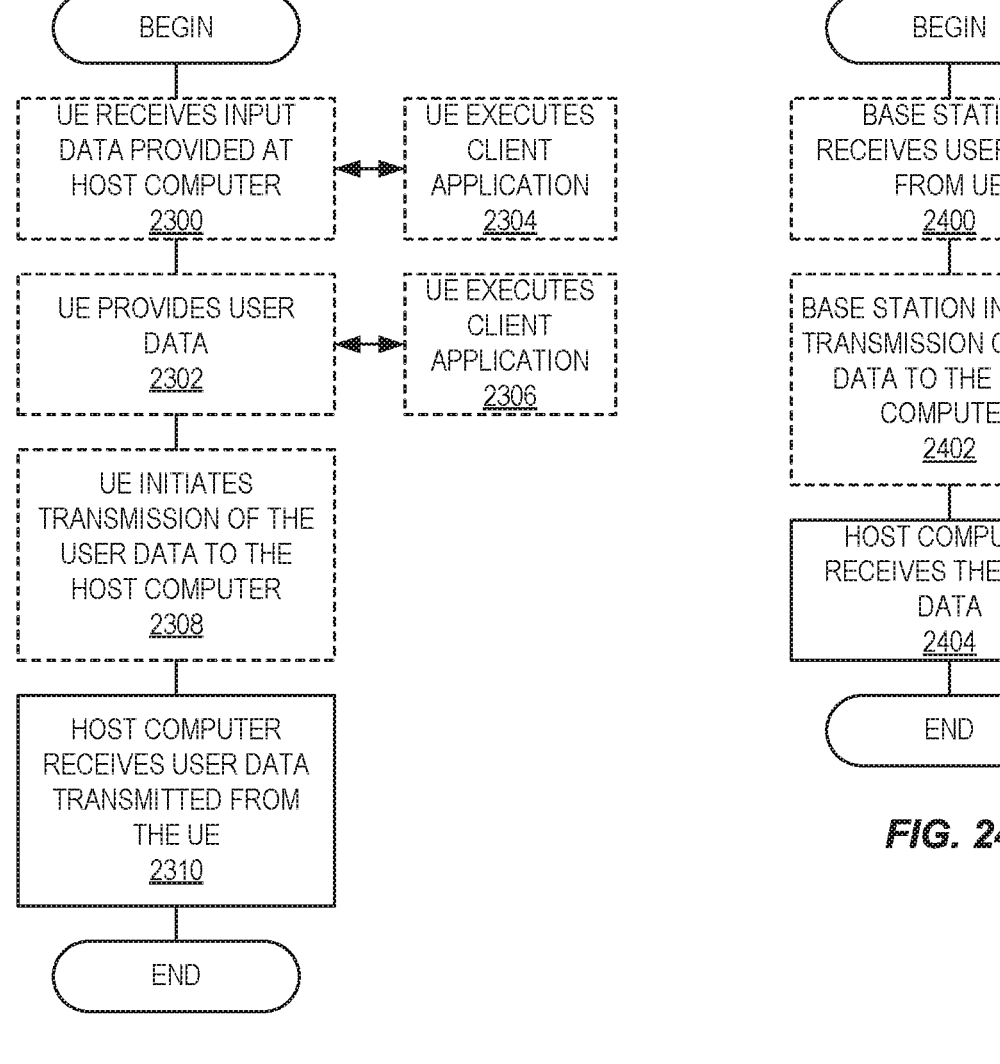

FIG. 23 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 23 will be included in this section. In step 2300 (which may be optional), the UE receives input data provided by the host computer. Additionally or alternatively, in step 2302, the UE provides user data. In sub-step 2304 (which may be optional) of step 2300, the UE provides the user data by executing a client application. In sub-step 2306 (which may be optional) of step 2302, the UE executes a client application which provides the user data in reaction to the received input data provided by the host computer. In providing the user data, the executed client application may further consider user input received from the user. Regardless of the specific manner in which the user data was provided, the UE initiates, in sub-step 2308 (which may be optional), transmission of the user data to the host computer. In step 2310 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 24 will be included in this section. In step 2400 (which may be optional), in accordance with the teachings of the embodiments described throughout this disclosure, the base station receives user data from the UE. In step 2402 (which may be optional), the base station initiates transmission of the received user data to the host computer. In step 2404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for linking PDCCH candidates in two linked Search Space, SS, sets, the method comprising one or more of: receiving (500), from a wireless node, a configuration of a first Control Resource Set, CORESET, associated with a first SS set and a second CORESET associated with a second SS set; determining (502) that the first SS set and the second SS set are configured with a common set of parameters comprising one or more of: i. a PDCCH monitoring periodicity of k_s slots; ii. a number of PDCCH candidates $$M_s^{(L)}$$

per aggregation level L; iii. a SS set type of either a Common Search Space, CSS, set or a UE Specific Search Space, USS, set; and iv. Downlink Control Information, DCI, formats to monitor; activating (504) the first CORESET with a first TCI state and the second CORESET with a second TCI state; linking (506) a first PDCCH candidate in a first PDCCH monitoring occasion in a first slot of the first SS set to a second PDCCH candidate in a second PDCCH monitoring occasion in a second slot of the second SS set; receiving (508), from the wireless node, a PDCCH in the first PDCCH candidate and the PDCCH in the second PDCCH candidate; and detecting (510) the PDCCH in the first and the second PDCCH candidates.

Embodiment 2: The method of embodiment 1 wherein the first and the second PDCCH candidates correspond to a same CCE aggregation level and have a same PDCCH candidate index.

Embodiment 3: The method of any of embodiments 1 to 2 further comprising: configuring the first and the second SS sets with one or more of: i. a first and a second PDCCH monitoring slot offsets, O_s1 and O_s2; ii. a first and a second duration, T_s1 and T_s2, indicating a number of consecutive slots for PDCCH monitoring; and iii. a first and a second PDCCH monitoring patterns within a PDCCH monitoring slot.

Embodiment 4: The method of any of embodiments 1 to 3 wherein the first slot n_1 of the first SS set and the slot $n_2$ of the second SS set satisfying $n_1 = nK_s + O_{s1} + i$ and $n_2 = nK_s + O_{s2} + i$, where n is an integer and $i = 0, 1, \ldots, \min(T_{s1}, T_{s2}) - 1$.

Embodiment 5: The method of any of embodiments 1 to 4 wherein the first PDCCH monitoring pattern contains a set of starting symbols with symbol indices $\{1_1, 1_2, \ldots, 1_{N_{s1}}\}$ and the second PDCCH monitoring pattern contains a set of starting symbols with symbol indices $\{s_1, s_2, \ldots, s_{N_{s2}}\}$, where $N_{s1}$ and $N_{s2}$ are integers.

Embodiment 6: The method of any of embodiments 1 to 5 wherein the first PDCCH monitoring occasion starts at symbol $1_i$ in the first slot of the first SS set and the second PDCCH monitoring occasion starts at symbol $s_i$ in the second slot of the second SS set, where $i = 1 \ldots, \min(N_{s1}, N_{s2})$.

Embodiment 7: The method of any of embodiments 1 to 6 further comprising: determining a time off set between reception of the PDCCH and a scheduled one of a PDSCH, a PUSCH, a CSI-RS, and a SRS, wherein the time offset is determined between a symbol of the first and the second PDCCH candidates occurring last in time and the first symbol of the corresponding one of PDSCH, PUSCH, CSI-RS, and SRS.

Embodiment 8: The method of any of embodiments 1 to 7 further comprising: determining a PUCCH resource for carrying a HARQ A/N associated with a scheduled PDSCH, wherein the determining a PUCCH resource comprises determining a PDCCH candidate among the first and the second PDCCH candidates associated with a SS set having a lower SS ID or with an associated CORESET having a lower CORESET ID.

Embodiment 9: The method of any of embodiments 1 to 8 wherein the PUCCH resource is determined based on the determined PDCCH candidate and the associated CORESET.

Embodiment 10: The method of any of embodiments 1 to 9 further comprising: determining a starting symbol of the PDCCH as the starting symbol is determined as the starting symbol of one of the first and the second PDCCH monitoring occasions occurring later in time.

Embodiment 11: The method of any of embodiments 1 to 10 wherein the first and the second SS sets are linked via an identifier.

Embodiment 12: The method of any of the previous embodiments, further comprising: providing user data; and forwarding the user data to a host computer via the transmission to the base station.

Group B Embodiments

Embodiment 13: A method performed by a base station for linking PDCCH candidates in two linked Search Space, SS, sets, the method comprising one or more of: configuring (600), a wireless node, with a configuration of a first Control Resource Set, CORESET, associated with a first SS set and a second CORESET associated with a second SS set; configuring (602) the first SS set and the second SS set with a common set of parameters comprising one or more of: i.a PDCCH monitoring periodicity of k_s slots; ii. a number of PDCCH candidates $$M_s^{(L)}$$

per aggregation level L; iii. a SS set type of either a Common Search Space, CSS, set or a UE Specific Search Space, USS, set; and iv. Downlink Control Information, DCI, formats to monitor; activating (604) the first CORESET with a first TCI state and the second CORESET with a second TCI state; linking (606) a first PDCCH candidate in a first PDCCH monitoring occasion in a first slot of the first SS set to a second PDCCH candidate in a second PDCCH monitoring occasion in a second slot of the second SS set; and transmitting (608), to the wireless node, a PDCCH in the first PDCCH candidate and the PDCCH in the second PDCCH candidate.

Embodiment 14: The method of embodiment 13 wherein the first and the second PDCCH candidates correspond to a same CCE aggregation level and have a same PDCCH candidate index.

Embodiment 15: The method of any of embodiments 13 to 14 further comprising: configuring the first and the second SS sets with one or more of: i. a first and a second PDCCH monitoring slot offsets, O_s1 and O_s2; ii. a first and a second duration, T_s1 and T_s2, indicating a number of consecutive slots for PDCCH monitoring; and iii. a first and a second PDCCH monitoring patterns within a PDCCH monitoring slot.

Embodiment 16: The method of any of embodiments 13 to 15 wherein the first slot $n_1$ of the first SS set and the second slot $n_2$ of the second SS set satisfying $n_1=nK_s+O_{s1}+i$ and $n_2=nK_s+O_{s2}+i$, where n is an integer and i=0, 1, ..., min $(T_{s1}, T_{s2})-1$.

Embodiment 17: The method of any of embodiments 13 to 16 wherein the first PDCCH monitoring pattern contains a set of starting symbols with symbol indices $\{l_1, l_2, ..., l_{N_{s1}}\}$ and the second PDCCH monitoring pattern contains a set of starting symbols with symbol indices $\{s_1, s_2, ..., s_{N_{s2}}\}$, where $N_{s1}$ and $N_{s2}$ are integers.

Embodiment 18: The method of any of embodiments 13 to 17 wherein the first PDCCH monitoring occasion starts at symbol $l_i$ in the first slot of the first SS set and the second PDCCH monitoring occasion starts at symbol $s_i$ in the second slot of the second SS set, where i=1 ..., min ($N_{s1}$, $N_{s2}$).

Embodiment 19: The method of any of embodiments 13 to 18 further comprising: determining a time offset between reception of the PDCCH and a scheduled one of a PDSCH, a PUSCH, a CSI-RS, and a SRS, wherein the time offset is determined between a symbol of the first and the second PDCCH candidates occurring last in time and the first symbol of the corresponding one of PDSCH, PUSCH, CSI-RS, and SRS.

Embodiment 20: The method of any of embodiments 13 to 19 further comprising: determining a PUCCH resource for carrying a HARQ A/N associated with a scheduled PDSCH, wherein the determining a PUCCH resource comprises determining a PDCCH candidate among the first and the second PDCCH candidates associated with a SS set having a lower SS ID or with an associated CORESET having a lower CORESET ID.

Embodiment 21: The method of any of embodiments 13 to 20 wherein the PUCCH resource is determined based on the determined PDCCH candidate and the associated CORESET.

Embodiment 22: The method of any of embodiments 13 to 21 further comprising: determining a starting symbol of the PDCCH as the starting symbol is determined as the starting symbol of one of the first and the second PDCCH monitoring occasions occurring later in time.

Embodiment 23: The method of any of embodiments 13 to 22 wherein the first and the second SS sets are linked via an identifier.

Embodiment 24: The method of any of the previous embodiments, further comprising: obtaining user data; and forwarding the user data to a host computer or a wireless device.

Group C Embodiments

Embodiment 25: A wireless device for linking PDCCH candidates in two linked Search Space, SS, sets, the wireless device comprising: processing circuitry configured to perform any of the steps of any of the Group A embodiments; and power supply circuitry configured to supply power to the wireless device.

Embodiment 26: A base station for linking PDCCH candidates in two linked Search Space, SS, sets, the base station comprising: processing circuitry configured to perform any of the steps of any of the Group B embodiments; and power supply circuitry configured to supply power to the base station.

Embodiment 27: A User Equipment, UE, for linking PDCCH candidates in two linked Search Space, SS, sets, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 28: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 29: The communication system of the previous embodiment further including the base station.

Embodiment 30: The communication system of the previous 2 embodiments, further including the UE, wherein the UE is configured to communicate with the base station.

Embodiment 31: The communication system of the previous 3 embodiments, wherein: the processing circuitry of the host computer is configured to execute a host application, thereby providing the user data; and the UE comprises processing circuitry configured to execute a client application associated with the host application.

Embodiment 32: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 33: The method of the previous embodiment, further comprising, at the base station, transmitting the user data.

Embodiment 34: The method of the previous 2 embodiments, wherein the user data is provided at the host computer by executing a host application, the method further comprising, at the UE, executing a client application associated with the host application.

Embodiment 35: A User Equipment, UE, configured to communicate with a base station, the UE comprising a radio interface and processing circuitry configured to perform the method of the previous 3 embodiments.

Embodiment 36: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 37: The communication system of the previous embodiment, wherein the cellular network further includes a base station configured to communicate with the UE.

Embodiment 38: The communication system of the previous 2 embodiments, wherein: the processing circuitry of the host computer is configured to execute a host application, thereby providing the user data; and the UE's processing circuitry is configured to execute a client application associated with the host application.

Embodiment 39: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 40: The method of the previous embodiment, further comprising at the UE, receiving the user data from the base station.

Embodiment 41: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 42: The communication system of the previous embodiment, further including the UE.

Embodiment 43: The communication system of the previous 2 embodiments, further including the base station, wherein the base station comprises a radio interface configured to communicate with the UE and a communication interface configured to forward to the host computer the user data carried by a transmission from the UE to the base station.

Embodiment 44: The communication system of the previous 3 embodiments, wherein: the processing circuitry of the host computer is configured to execute a host application; and the UE's processing circuitry is configured to execute a client application associated with the host application, thereby providing the user data.

Embodiment 45: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 46: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 47: The method of the previous embodiment, further comprising, at the UE, providing the user data to the base station.

Embodiment 48: The method of the previous 2 embodiments, further comprising: at the UE, executing a client application, thereby providing the user data to be transmitted; and at the host computer, executing a host application associated with the client application.

Embodiment 49: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 50: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 51: The communication system of the previous embodiment further including the base station.

Embodiment 52: The communication system of the previous 2 embodiments, further including the UE, wherein the UE is configured to communicate with the base station.

Embodiment 53: The communication system of the previous 3 embodiments, wherein: the processing circuitry of the host computer is configured to execute a host application; and the UE is configured to execute a client application associated with the host application, thereby providing the user data to be received by the host computer.

Embodiment 54: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 55: The method of the previous embodiment, further comprising at the base station, receiving the user data from the UE.

Embodiment 56: The method of the previous 2 embodiments, further comprising at the base station, initiating a transmission of the received user data to the host computer.

Some embodiments of the present disclosure could be implemented using one or more of the following proposals.

Proposal 1 Confirm the working assumption for PDCCH reliability enhancements with non-SFN schemes and Option 2+Case 1, i.e. support Alt3 (two SS sets associated with corresponding CORESETs).

Proposal 2 When PDCCH repetition is enabled for the UE, the default is that two PDCCH candidates are linked. FFS whether more than two can be configured to be linked Proposal 3 Two blind decodes per PDCCH pair is counted towards BD limit for the UE when the PDCCH consists of two PDCCH candidates that are linked.

Proposal 4 Support Alt.2 and use one of the linked PDCCH candidates in a CORESET having the lowest controlResourceSetId or a SS set with lowest searchSpaceId in the linked SS sets.

Proposal 5 The PDCCH symbol occurring latest in time in a pair of linked PDCCH candidates is defined as the last symbol regardless of which PDCCH candidate(s) the UE actually have detected.

Proposal 6 The DAI counter DAI is incremented only at the first time a PDCCH is transmitted (i.e., at the first PDCCH occasion) in a linked pair of PDCCH candidates.

Proposal 7 The existing procedure for type 2 HARQ-ACK codebook construction is applied only for the first PDCCH occasion in case of PDCCH repetition regardless whether the PDCCH is actually detected in the first or/and the second PDCCH occasion.

Proposal 8 In case the CORESET is not configured as unavailable for PDSCH and if a PDSCH scheduled by a pair of PDCCHs overlap with resources in the CORESETs containing the PDCCHs, PDSCH rate matching is done around the union of the linked PDCCH candidates and corresponding DM-RS Proposal 9 DCI Format 2-2/2-3 are also supported by multi-TRP based PDCCH enhancements.

Proposal 10 One of the two activated TCI states is used as the default TCI state, FFS whether the one is specified or indicated in a MAC CE activating the TCI states.

Proposal 11 Consider finalizing PDCCH enhancement with intra-slot PDCCH repetition first.

Proposal 12 For codebook/non-codebook based multi-TRP PUSCH, support two separate SRI fields in DCI, where the first SRI field indicates the SRI(s) corresponding to the first TRP and the second SRI field indicates the SRI(s) corresponding to the second TRP.

Proposal 13 For codebook based multi-TRP PUSCH, support two separate TPMI fields in DCI, where the first TPMI field indicates the TPMI corresponding to the first TRP and the second TPMI field indicates the TPMI corresponding to the second TRP. The number of layers indicated in the first TPMI field and the second TPMI field are the same.

Proposal 14 For per TRP closed-loop power control for PUSCH, Option 3 is supported where a second TPC field is added in DCI formats 0_1/0_2.

Proposal 15 Dynamic switching between PUSCH transmission to a single-TRP and multi-TRP should be supported, i.e. each PUSCH transmission is either targeting reception at one or at two TRPs.

Proposal 16 Two SRI/TPMI fields are supported for PUSCH repetition towards m-TRP.

Proposal 17 To dynamically indicate PUSCH transmission towards a single-TRP or multiple-TRPs, each SRI/

TPMI field contains a codepoint that indicates whether the SRI/TPMI field is disabled or not.

Proposal 18 For CG PUSCH transmission towards multiple TRPs, support Alt.1.

Proposal 19 Reuse the same RV mapping method as in PUSCH repetition Type A for PUSCH repetition Type B Proposal 20 Consider allowing back-to-back scheduling of PUSCH repetitions via multiple DCIs over multiple TRPs in NR Rel-17.

Proposal 21 To improve A-CSI reliability, support A-CSI multiplexing on at least two PUSCH occasions towards different TRPs in NR Rel-17.

Proposal 22 Intra-slot beam hopping (Scheme 2) is not supported in NR Rel-17.

Proposal 23 Support Multi-TRP intra-slot repetition (Scheme 3) in NR Rel-17

Proposal 24 Both short and long PUCCH formats are supported for Intra-slot repetition Proposal 25 For per TRP closed-loop power control for PUCCH, support either Option 3 (two TPC fields in DCI 1_1/1_2) or Option 4 (one codepoint in TPC field indicating two TPC values) in NR Rel-17.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ACK Acknowledgement
AF Application Function
AMF Access and Mobility Function
AN Access Network
AP Access Point
ASIC Application Specific Integrated Circuit
AUSF Authentication Server Function
BWP Bandwidth Part
C-RNTI Cell Radio Network Temporary Identifier
CCE Control Channel Element
CG Configured Grant
CORESET Control Resource Set
CP-OFDM Cyclic Prefix Orthogonal Frequency Division Multiplexing
CPU Central Processing Unit
CSI Channel State Information
CSI-RS Channel State Information Reference Signal
CSS Common Search Space
DCI Downlink Control Information
DFT Discrete Fourier Transform
DL Downlink
DMRS Demodulation Reference Signal
DN Data Network
DSP Digital Signal Processor
eNB Enhanced or Evolved Node B
FDM Frequency Domain Multiplexing
FPGA Field Programmable Gate Array
gNB New Radio Base Station
gNB-CU New Radio Base Station Central Unit
gNB-DU New Radio Base Station Distributed Unit
HARQ Hybrid Automatic Repeat Request
HSS Home Subscriber Server
IoT Internet of Things
IP Internet Protocol
LTE Long Term Evolution
MME Mobility Management Entity
MTC Machine Type Communication
NACK Negative Acknowledgement
NEF Network Exposure Function NF Network Function
NR New Radio
NRF Network Function Repository Function
NSSF Network Slice Selection Function
OFDM Orthogonal Frequency Division Multiplexing
OTT Over-the-Top
PC Personal Computer
PCF Policy Control Function
PDCCH Physical Downlink Control Channel
PDSCH Physical Downlink Shared Channel
P-GW Packet Data Network Gateway
PRI Precoding Rank Indicator
PUCCH Physical Uplink Control Channel
PUSCH Physical Uplink Shared Channel
QCL Quasi Co-Located
QoS Quality of Service
RAM Random Access Memory
RAN Radio Access Network
RB Resource Block
RE Resource Element
REG Resource Element Group
RNTI Radio Network Temporary Identifier
ROM Read Only Memory
RRH Remote Radio Head
RS Reference Signal
RTT Round Trip Time
SCEF Service Capability Exposure Function
SLIV Start and Length Indicator Value
SMF Session Management Function
SPS Semi-Persistent Scheduling
SR Scheduling Request
SRS Sounding Reference Signal
SS Search Space
SSB Synchronization Signal Block
TCI Transmission Configuration Indicator
TDM Time Domain Multiplexing
UDM Unified Data Management
UE User Equipment
UL Uplink
UPF User Plane Function
USS UE Specific Search Space Those skilled in the art will recognize improvements and modifications to the embodiments of the present disclosure. All such improvements and modifications are considered within the scope of the concepts disclosed herein.

The invention claimed is:

1. A method performed by a wireless device for monitoring Physical Downlink Control Channel, PDCCH, in two linked Search Space, SS, sets, the method comprising:

receiving, from a wireless node, a configuration of a first Control Resource Set, CORESET, associated with a first SS set and a second CORESET associated with a second SS set, wherein the first and second SS sets are linked, and the first SS set and the second SS set are configured with a common set of parameters comprising:

a PDCCH monitoring periodicity of $k_s$ slots;
a PDCCH monitoring offset of $o_s$ slots;
a number of PDCCH candidates $$M_s^{(L)}$$

per aggregation level L;
a duration of T_s slots;
a number of starting symbols or PDCCH monitoring occasions per slot;

a SS set type of either a Common Search Space, CSS, set or a user equipment, UE, Specific Search Space, USS, set; and Downlink Control Information, DCI, formats to monitor;

receiving a command activating the first CORESET with a first TCI state and the second CORESET with a second TCI state;

determining, for each aggregation level, a first PDCCH candidate in the first CORESET in a first PDCCH monitoring occasion of the first SS set in a first slot and a second PDCCH candidate in the second CORESET in a second PDCCH monitoring occasion of the second SS set in a second slot, wherein the first slot and the second slot are the same;

receiving, from the wireless node, a PDCCH in the first PDCCH candidate and a repetition of the PDCCH in the second PDCCH candidate; and detecting DCI carried by the PDCCH in the first and the second PDCCH candidates.

2. The method of claim 1 wherein the first and the second PDCCH candidates correspond to a same CCE aggregation level and have a same PDCCH candidate index in the respective CORESETs.

3. The method of claim 1, wherein the first and second PDCCH monitoring occasions have a same index according to each of the first and second SS sets in the first and second slot.

4. The method of claim 1, wherein the first and second slots are the same slot.

5. The method of claim 1 further comprising:

configuring the first and the second SS sets with one or more of:

a first and a second PDCCH monitoring slot offsets, $O_{s1}$ and $O_{s2}$;

a first and a second duration, $T_{s1}$ and $T_{s2}$, indicating a number of consecutive slots for PDCCH monitoring; and a first and a second PDCCH monitoring patterns or number of starting symbols within a PDCCH monitoring slot.

6. The method of claim 1 wherein the first slot $n_1$ of the first SS set and the second slot $n_2$ of the second SS set satisfying $n_1 = nK_s + O_{s1} + i$ and $n_2 = nK_s + O_{s2} + i$, where n is an integer and $i = 0, 1, \ldots, \min(T_{s1}, T_{s2}) - 1$.

7. The method of claim 1, wherein the first PDCCH monitoring pattern contains a set of starting symbols with symbol indices $\{l_1, l_2, \ldots, l_{N_{s1}}\}$ and the second PDCCH monitoring pattern contains a set of starting symbols with symbol indices $\{s_1, s_2, \ldots, s_{N_{s2}}\}$, where $N_{s1}$ and $N_{s2}$ are integers.

8. The method of claim 1, wherein the first PDCCH monitoring occasion starts at symbol $l_i$ in the first slot of the first SS set and the second PDCCH monitoring occasion starts at symbol $s_i$ in the second slot of the second SS set, where $i = 1 \ldots, \min(N_{s1}, N_{s2})$.

9. The method of claim 1 further comprising:

determining a time off set between reception of the PDCCH and a scheduled one of a Physical Downlink Shared Channel, PDSCH, a Physical Uplink Shared Channel, PUSCH, a Channel State Information Reference signal, CSI-RS, and a Sounding Reference Signal, SRS, wherein the time offset is determined between a symbol of the first and the second PDCCH candidates occurring last in time and the first symbol of the corresponding one of PDSCH, PUSCH, CSI-RS, and SRS.

10. The method of claim 1 further comprising:

determining a Physical Uplink Control Channel, PUCCH, resource for carrying a hybrid Automatic Repeat Request Acknowledgement, HARQ-ACK, information associated with a scheduled PDSCH, wherein the determining a PUCCH resource comprises determining a PDCCH candidate among the first and the second PDCCH candidates associated with a SS set having a lower SS ID or with an associated CORESET having a lower CORESET ID.

11. The method of claim 1, wherein the PUCCH resource is determined based on the determined PDCCH candidate and the associated CORESET.

12. The method of claim 1 further comprising:

determining a starting symbol of the PDCCH carrying a DCI format 1_2 scheduling a PDSCH with mapping type B as the starting symbol of one of the first and the second PDCCH monitoring occasions occurring later in time.

13. The method of claim 1, wherein the first and the second SS sets are linked via an identifier.

14. The method of claim 1, wherein the wireless device operates in a New Radio, NR, communications network.

15. A method performed by a base station for transmitting Physical Downlink Control Channel, PDCCH, in two linked Search Space, SS, sets, the method comprising:

configuring, a wireless node, with a configuration of a first Control Resource Set, CORESET, associated with a first SS set and a second CORESET associated with a second SS set, wherein the first and second SS sets are linked;

configuring the first SS set and the second SS set with a common set of parameters comprising:

a PDCCH monitoring periodicity of $k_s$ slots;

a PDCCH monitoring offset of $o_s$ slots;

a duration of T_s slots;

a number of starting symbols or PDCCH monitoring occasions per slot;

a number of PDCCH candidates $$M_s^{(L)}$$

per aggregation level L;

a SS set type of either a Common Search Space, CSS, set or a user equipment, UE, Specific Search Space, USS, set; and Downlink Control Information, DCI, formats to monitor;

activating the first CORESET with a first TCI state and the second CORESET with a second TCI state;

determining, for each aggregation level, a first PDCCH candidate in the first CORESET in a first PDCCH monitoring occasion of the first SS set in a first slot and a second PDCCH candidate in the second CORESET in a second PDCCH monitoring occasion of the second SS set in a second slot, wherein the first slot and the second slot are the same; and transmitting, to the wireless node, a PDCCH in the first PDCCH candidate and the same PDCCH in the second PDCCH candidate.

16. The method of claim 15 wherein the first and second PDCCH candidates correspond to a same CCE aggregation level and have a same PDCCH candidate index in the respective CORESETs.

17. The method of claim 15, wherein the first and second PDCCH monitoring occasions have a same index according to each of the first and second SS sets in the first and second slot.

18. The method of claim 15, wherein the first and second slots are the same slot.

19. The method of claim 15 further comprising:

configuring the first and the second SS sets with one or more of:

a first and a second PDCCH monitoring slot offsets, O_s1 and O_s2;

a first and a second duration, T_s1 and T_s2, indicating a number of consecutive slots for PDCCH monitoring; and a first and a second PDCCH monitoring patterns or number of starting symbols within a PDCCH monitoring slot.

20. The method of claim 15, wherein the first slot $n_1$ of the first SS set and the second slot $n_2$ of the second SS set satisfying $n_1=nK_s+O_{s1}+i$ and $n_2=nK_s+O_{s2}+i$, where n is an integer and i=0, 1, . . . , min $(T_{s1}, T_{s2})-1$.

21. The method of claim 15, wherein the first PDCCH monitoring pattern contains a set of starting symbols with symbol indices $\{l_1, l_2, \ldots, l_{N_{s1}}\}$ and the second PDCCH monitoring pattern contains a set of starting symbols with symbol indices $\{s_1, s_2, \ldots, s_{N_{s2}}\}$, where $N_{s1}$ and $N_{s2}$ are integers.

22. The method of claim 15, wherein the first PDCCH monitoring occasion starts at symbol $l_i$ in the first slot of the first SS set and the second PDCCH monitoring occasion starts at symbol $s_i$ in the second slot of the second SS set, where i=1 . . . , min $(N_{s1}, N_{s2})$.

23. The method of claim 15 further comprising:

determining a time off set between reception of the PDCCH and a scheduled one of a Physical Downlink Shared Channel, PDSCH, a Physical Uplink Shared Channel, PUSCH, a Channel State Information Reference signal, CSI-RS, and a Sounding Reference Signal, SRS, wherein the time offset is determined between a symbol of the first and the second PDCCH candidates occurring last in time and the first symbol of the corresponding one of PDSCH, PUSCH, CSI-RS, and SRS.

24. The method of claim 15 further comprising:

determining a Physical Uplink Control Channel, PUCCH, resource for carrying a hybrid Automatic Repeat Request Acknowledgement, HARQ-ACK, information associated with a scheduled PDSCH, wherein the determining a PUCCH resource comprises determining a PDCCH candidate among the first and the second PDCCH candidates associated with a SS set having a lower SS ID or with an associated CORESET having a lower CORESET ID.

25. A wireless device comprising:

one or more transmitters;

one or more receivers; and processing circuitry associated with the one or more transmitters and the one or more receivers, the processing circuitry configured to cause the wireless device to:

receive, from a wireless node, a configuration of a first Control Resource Set, CORESET, associated with a first SS set and a second CORESET associated with a second SS set, wherein the first and second SS sets are linked, and the first SS set and the second SS set are configured with a common set of parameters comprising:

a PDCCH monitoring periodicity of $k_s$ slots;

a PDCCH monitoring offset of $o_s$ slots;

a number of PDCCH candidates $$M_s^{(L)}$$

aggregation level L;

a duration of T_s slots;

a number of starting symbols or PDCCH monitoring occasions per slot;

a SS set type of either a Common Search Space, CSS, set or a user equipment, UE, Specific Search Space, USS, set; and Downlink Control Information, DCI, formats to monitor;

receive a command activating the first CORESET with a first TCI state and the second CORESET with a second TCI state;

determine, for each aggregation level, a first PDCCH candidate in the first CORESET in a first PDCCH monitoring occasion of the first SS set in a first slot and a second PDCCH candidate in the second CORESET in a second PDCCH monitoring occasion of the second SS set in a second slot, wherein the first slot and the second slot are the same;

receive, from the wireless node, a PDCCH in the first PDCCH candidate and a repetition of the PDCCH in the second PDCCH candidate; and detect DCI carried by the PDCCH in the first and the second PDCCH candidates.

26. A radio access node comprising:

one or more transmitters;

one or more receivers; and processing circuitry associated with the one or more transmitters and the one or more receivers, the process ing circuitry configured to cause the radio access node to:

configure, a wireless node, with a configuration of a first Control Resource Set, CORESET, associated with a first SS set and a second CORESET associated with a second SS set, wherein the first and second SS sets are linked;

configure the first SS set and the second SS set with a common set of parameters comprising:

a PDCCH monitoring periodicity of $k_s$ slots;

a PDCCH monitoring offset of $o_s$ slots;

a duration of T_s slots;

a number of starting symbols or PDCCH monitoring occasions per slot;

a number of PDCCH candidates $$M_s^{(L)}$$

per aggregation level L;

a SS set type of either a Common Search Space, CSS, set or a user equipment, UE, Specific Search Space, USS, set; and Downlink Control Information, DCI, formats to monitor;

activate the first CORESET with a first TCI state and the second CORESET with a second TCI state;

determine, for each aggregation level, a first PDCCH candidate in the first CORESET in a first PDCCH monitoring occasion of the first SS set in a first slot and a second PDCCH candidate in the second CORESET in a second PDCCH monitoring occasion of the second SS set in a second slot, wherein the first slot and the second slot are the same; and transmit, to the wireless node, a PDCCH in the first PDCCH candidate and the same PDCCH in the second PDCCH candidate.

* * * * *